(12) United States Patent
Richter

(10) Patent No.: US 10,624,373 B2
(45) Date of Patent: *Apr. 21, 2020

(54) DEVICE AND METHOD FOR THE HIGH-PRESSURE TREATMENT OF PRODUCTS

(71) Applicant: MULTIVAC SEPP HAGGENMUELLER SE & CO. KG, Wolfertschwenden (DE)

(72) Inventor: Tobias Richter, Memmingen (DE)

(73) Assignee: MULTIVAC SEPP HAGGENMUELLER SE & CO. KG, Wolfertschwenden (DE)

( * ) Notice: Subject to any disclaimer, the term of this patent is extended or adjusted under 35 U.S.C. 154(b) by 1165 days.

This patent is subject to a terminal disclaimer.

(21) Appl. No.: 14/278,695

(22) Filed: May 15, 2014

(65) Prior Publication Data
US 2014/0248408 A1    Sep. 4, 2014

Related U.S. Application Data

(63) Continuation of application No. 12/884,841, filed on Sep. 17, 2010, now Pat. No. 8,771,773.

(30) Foreign Application Priority Data

Sep. 18, 2009  (DE) .......................... 10 2009 042 088

(51) Int. Cl.
*A23L 3/015*    (2006.01)
*B65B 25/00*    (2006.01)
(Continued)

(52) U.S. Cl.
CPC .......... *A23L 3/0155* (2013.01); *B65B 25/001* (2013.01); *B65B 31/00* (2013.01);
(Continued)

(58) Field of Classification Search
CPC ........... A23L 3/0155; Y10T 137/86493; Y10T 137/0396; Y10T 137/0379; B65D 81/28;
(Continued)

(56) References Cited

U.S. PATENT DOCUMENTS 4,055,672 A    10/1977  Hirsch et al.
5,165,325 A *  11/1992  Akatsu ...................... A23L 2/42
                                            422/112

(Continued)

FOREIGN PATENT DOCUMENTS

CA    2375764 A1    1/2001
DE    196536        3/1908
(Continued)

OTHER PUBLICATIONS

Iwahashi, H.; Shimizu, H.; Odani, M.; Komatsu, Y.: Phiezophysiology of genome wide expression levels in the yeast *Saccharomyces cerevisiae*. Extremophiles 7 (2003), S. 291-298.

(Continued)

*Primary Examiner* — Drew E Becker
(74) *Attorney, Agent, or Firm* — Brooks Kushman P.C.

(57) ABSTRACT

The present disclosure relates to a device for the high-pressure treatment of products, particularly of packaged foodstuffs. The device comprises a high-pressure chamber and a discharge valve for discharging high-pressure medium out of the high-pressure chamber. The invention is characterized in that a controllable actuator is provided for adjusting the rate of the pressure decrease in the high-pressure chamber at least over a predetermined pressure range. The disclosure also relates to a method for the high-pressure treatment of products, wherein pressure decrease takes place in a first phase and in a second phase, and the mean pressure decrease rate in the first phase is higher than in the second phase.

19 Claims, 7 Drawing Sheets

(51) Int. Cl.
  *B65B 31/00* (2006.01)
  *B65B 55/02* (2006.01)
  *B65B 31/02* (2006.01)

(52) U.S. Cl.
  CPC ............ *B65B 31/024* (2013.01); *B65B 55/02* (2013.01); *Y10T 137/0379* (2015.04); *Y10T 137/0396* (2015.04); *Y10T 137/86493* (2015.04)

(58) Field of Classification Search
  CPC . B65B 31/024; B65B 25/001; B65B 25/0041; B65B 25/062; B65B 25/067; B65B 31/02–31/08; B65B 55/02–55/19
  USPC .................................................. 426/392, 416
  See application file for complete search history.

(56) References Cited

U.S. PATENT DOCUMENTS

| | | | | |
|---|---|---|---|---|
| 5,288,462 | A | * | 2/1994 | Carter .................. A23L 3/0155 137/535 |
| 5,344,609 | A | * | 9/1994 | Long .................... A23B 4/0053 422/26 |
| 5,693,350 | A | | 12/1997 | Fernandez et al. |
| 5,932,272 | A | | 8/1999 | Raemy et al. |
| 6,004,508 | A | * | 12/1999 | Platz .................... A23L 2/42 422/26 |
| 6,117,460 | A | | 9/2000 | Kortschack |
| 6,136,609 | A | * | 10/2000 | Sato ..................... A23L 3/0155 422/1 |
| 6,194,040 | B1 | | 2/2001 | Delius et al. |
| 7,565,802 | B2 | | 7/2009 | Bergman et al. |
| 8,771,773 | B2 | * | 7/2014 | Richter ................ A23L 3/0155 137/12 |
| 2001/0038806 | A1 | | 11/2001 | Platz et al. |
| 2002/0009526 | A1 | * | 1/2002 | Tate ....................... A22C 9/00 426/521 |
| 2003/0170356 | A1 | * | 9/2003 | Yuan .................... A23L 3/0155 426/313 |
| 2003/0228239 | A1 | * | 12/2003 | Meyer .................. A23L 3/0155 422/39 |
| 2004/0033296 | A1 | | 2/2004 | Yuan et al. |
| 2004/0131742 | A1 | | 7/2004 | Fukaya et al. |
| 2004/0191382 | A1 | | 9/2004 | Cooper et al. |
| 2005/0051194 | A1 | * | 3/2005 | Sakashita ............. G03F 7/422 134/21 |
| 2005/0112252 | A1 | * | 5/2005 | Tewari .................. A23L 3/0155 426/392 |
| 2006/0099306 | A1 | | 5/2006 | Miller |
| 2006/0272709 | A1 | * | 12/2006 | Ting ..................... A23L 3/0155 137/487.5 |
| 2007/0144587 | A1 | * | 6/2007 | Bergman .............. A23L 3/0155 137/565.33 |
| 2007/0237865 | A1 | | 10/2007 | Love et al. |
| 2008/0260916 | A1 | | 10/2008 | Kortschack |
| 2012/0269953 | A1 | | 10/2012 | Parker et al. |
| 2014/0186499 | A1 | * | 7/2014 | Hukelmann ......... A22C 7/0046 426/231 |

FOREIGN PATENT DOCUMENTS

| | | |
|---|---|---|
| DE | 26 11 389 A1 | 9/1976 |
| DE | 42 26 255 A1 | 2/1994 |
| DE | 37 34 025 C2 | 11/1994 |
| DE | 196 53 677 C1 | 9/1997 |
| DE | 196 49 952 A1 | 6/1998 |
| DE | 197 38 800 A1 | 3/1999 |
| DE | 198 01 031 A1 | 7/1999 |
| DE | 199 39 677 A1 | 2/2001 |
| DE | 101 01 958 A1 | 7/2002 |
| DE | 10 2005 011 868 A1 | 9/2006 |
| EP | 0 588 010 A1 | 3/1994 |
| EP | 0 683 986 B1 | 11/1995 |
| EP | 0 689 391 B1 | 1/1996 |
| EP | 0 713 654 A1 | 5/1996 |
| EP | 0 748 592 B1 | 12/1996 |
| EP | 1 100 340 B1 | 5/2001 |
| EP | 1 112 008 B1 | 7/2001 |
| EP | 0 752 211 B1 | 10/2001 |
| EP | 1 201 252 B1 | 5/2002 |
| EP | 0879560 B1 | 12/2002 |
| GB | 2449726 A1 | 12/2008 |
| WO | 0103505 A1 | 1/2001 |
| WO | 0103519 A1 | 1/2001 |
| WO | 03013279 A2 | 2/2003 |
| WO | 03070025 A1 | 8/2003 |
| WO | 03094637 A1 | 11/2003 |
| WO | 2004/000451 A2 | 12/2003 |
| WO | 2006022799 A2 | 3/2006 |
| WO | 2006/097248 A1 | 9/2006 |
| WO | 2006/129180 A1 | 12/2006 |

OTHER PUBLICATIONS

Johansson, F.; Laufven, A.: Concentration and Interactive Effects on the Sorption of Aroma Liquids and Vapors into Polypropylene. Journal of Food Science 62 (1997), Nr. 2, S. 355-358.

Kador, L.; Schittkowski, T.; Bauer, M.; Fan, Y.: Three-dimensional materials analysis by confocal Raman microspectroscopy. Applied Optics 40 (2001), Nr. 28, S. 4965-4970.

Kip, B. J.; Gurp van, M.; Heel van, S. P.; Meier, R. J.: Orientational order in polyethylene foils: A polarized Raman spectroscopic study. Journal of Raman Spectroscopy 24 (1993), Nr. 8, S. 501-510.

Kobori, H.; Sato, M.; Tameike, A.; Hamada, K.; Shimada, S.; Osumi, M.: Ultrastructural effects of pressure stress to the necleus in *Saccharomyces cerevisiae*. FEMS Microbiology Letters 3132 (1995), S. 253-258.

Kompaniets, L. V.; Kuptsov, S. A.; Erina, N. A.; Dubnikova, I. L.; Zharov, A. A.; Prut, E. V.: Effect of joint action of high pressure and shear deformation on mechanical degradation of isotactic polypropylene. Polymer Degradation and Stability 84 (2004), S. 61-68.

Kosjek, B.; Stampfer, W.; Deursen van, R.; Faber, K.; Kroutil, W.: Efficient production of raspberry ketone via 'green' biocatalytic oxidation. Tetrahedron 59 (2003), S. 9517-9521.

Kumazawa H.; Bae S.-Y.: Sorption and Permeation Behavior for a Gas in Glassy Polymer Membrane near the Glass Transition Temperature. Journal of Applied Polymer Science 60 (1996), S. 115-121.

Kuebel, J.; Ludwig, H.; Marx, H.; Tauscher, B.: Diffusion of Aroma Compounds Into Packaging Films Under High Pressure. Packaging Technology and Science. 9 (1996), 143-152.

Lambert, Y.; Demazeau, G.; Largeteau, A.: Packaging for high-pressure treatments in the food industry. Packaging Technology and Science 13 (2000), Nr. 2, S. 63-71.

Le-Bail, A.; Hamadami, N.; Bahuaud, 5: Effect of High-pressure Processing on the Mechanical and Barrier Properties of Selected Packagings. Packaging Technology and Science 19 (2006), S. 237-243.

Lin, H., Freeman, B. D.: Gas Solubility, Diffusivity and Permeability in Poly(ethylene oxide). Journal of Membrane Science 239 (2004), S. 105-117.

Lopez-Rubio, A.; Lagaron, J. M.; Hernandez-Mundoz, P.: Effect of high-pressure treatments on the properties of EVOH-based food packaging materials. Innovative Food Science and Emerging Technologies 6 (2005), Nr. 1, S. 51-58.

Lu, S.; Russell, A. E.; Hendra, P. J.: The Raman spectra of high modulus polyethylene fibers by Raman microscopy. Journal of Material Science 33 (1998), S. 4721-4725.

Ludwig, H.; Marx, H.; Tauscher, B.: Interaction of food packaging material and selected food components under high pressure. High Pressure Research 12 (1994), 251-254.

Ludwig, H.; MacDonald, A. G.: The significance of the activity of dissolved oxygen, and other gases, enhanced by high hydrostatic pressure. Comparative Biochemistry and Physiology, Part A 140 (2005), S. 387-395.

(56) References Cited

OTHER PUBLICATIONS

Macedo, P. B.; Litowitz, T. A.: On the Relative Roles of Free Volume and Activation Energy in the Viscosity of Liquids, Journal of Chemical Physics 42 (1965), Nr. 1, S. 245-256.
Chung, H.S.: On the Macedo—Litovitz Hybrid Equation for Liquid Viscosity. Journal of Chemical Physics 44 (1966), Nr. 4, S. 1362-1364.
Machin, D.; Rogers, C. E.: Free Volume Theories for Penetrant Diffusion in Polymers. Die Makromolekulare Chemie 155 (1972), Nr. 1, S. 269-281.
Mandelkern L., Alamo R. G.; Kennedy M. A.: Interphase Thickness of linear Polyethylene; Macromolecules 23(1990), Nr. 21, S. 4721-4723.
Marais, S.; Nguyen, T.; Devallencourt, C.; Metayer, M.; Nguyen, T. U.; Schaetzel, P.: Permeation of Water through Polar and Nonpolar Polymers and Copolymers: Determination of the Concentration-Dependent Diffusion Coefficient. Journal of Polymer Science—B—Polymer Physics Edition 38 (2000), Nr. 15, S. 1998-2008.
Mauviel, G.; Berthiaud, J: Vallieres, C.; Roizard, D.; Favre, E.: Dense membrane permeation: From the limitations of the permeability concept back to the solution-diffusion model. Journal of Membrane Science 266 (2005), S. 62-67.
Mauze,C. R.; Stern, S. A.: The Dual-Mode Solution and Transport of Water in Poly(acrylonitrile). Polymer Engineering and Science 23 (1983), S. 548-555.
Maxfield, J.; Stein, R. S.; Chen, M. C.: Polarized Raman Studies of Crystalline and Amorphous Orientation in Polyethylene. Journal of Polymer Science Part B: Polymer Physics 16 (1978), Nr. 1, S. 37-48.
McGonigle E.-A.; Liggat J. J.; Pethrick, R. A.; Jenkins, R. A.; Daly, J. H.; Hayward, D.: Permeability of N2, Ar, He, O2 and CO2 through biaxially oriented polyester films—dependence on free volume. Polymer 42 (2001), S. 2413-2426.
Meier, R. J.: Studying the length of trans conformational sequences in polyethylene using Raman spectroscopy: a computational study. Polymer 43 (2002), S. 517-522.
Melveger, A. J.: Laser-Raman Study of Crystallinity Changes in Poly(ethylene Terephthalate). Journal of Polymer Science Part A-2: Polymer Physics 10 (1972), Nr. 2, S. 317-322.
Morris, C.; Brody, A. L.; Wicker, L.: Non-Thermal Food Processing/Preservation Technologies: A Review with Packaging Implications. Packaging Technology and Science 20 (2007), S. 275-286.
Mrkic, S.; Galic, K.; Ivankovic, M.; Hamin, S.; Cikovic, N.: Gas Transport and Thermal Characterization of Mono- and Di-Polyethylene Films Used for Food Packaging. Journal of Applied Polymer Science 99 (2006), S. 1590-1599.
Murnaghan, F.D.: Finite Deformations of an Elastic Solid. American Journal of Mathematics 59, No. 2 (1937), S. 235-260.
Nayler, C. C.; Meier, R. J.; Kip, B. J.; Williams, K. P. J.; Mason, S. M.; Conroy, N.; Gerrard, D. L.: Raman Spectroscopy Employed for the Determination of the Intermediate Phase in Polyethylene; Macromolecules 28 (1995), S. 2969-2978.
Olafson, G.; Hildigsson, I.; Bergenstahl, B.: Transport of Oleic and Acetic Acids from Emulsions into Low Density Polyethylene; Effects of Adhesion with Aluminum Foil in Laminated Packaging. Journal of Food Science 60 (1995), S. 420-425.
Otegui, J.; Vega, J. F.; Martin, S.; Cruz, V.; Flores, A.; Domingo, C.; Martinez-Salazar, J.: The unit cell expansion of branched polyethylene as detected by Raman spectroscopy: an experimental and simulation approach. Journal of Material Science 42 (2007), S. 1046-1049.
Pace R. J.; Datyner A.: Statistical Mechanical Model of Diffusion of Complex Penetrants in Polymers. Journal of Polymer Science—Polymer Physics Edition 17 (1979), S. 1675-1692.
Peterlin, A.: Dependence of Diffusive Transport on Morphology of Crystalline Polymers. Journal of Macromolecular Science, Part B 11 (1975), Nr. 1, S. 57-87.
Petersen, J. H.; Trier, X. T.; Fabech, B.: Mathematical modelling of migration: A suitable tool for the enforcement authorities? Food Additives and Contaminants 22 (2005), Nr. 10, S. 938-944.

Picard, A.; Daniel, I.; Montagnac, G.; Oger, P.: In situ monitoring by quantitative Raman spectroscopy of alcoholic fermentation by *Saccharomyces cerevisiae* under high pressure. Extermophiles 11 (2007), S. 445-452.
Pigeon, M.; Prud'homme, R. E.; Pbzolet, M.: Characterization of Molecular Orientation in Polyethylene by Raman Spectroscopy. Macromolecules 24 (1991), Nr. 20, S. 5687-5694.
Puppels, G.J.; de Mul, F. F. M.; Otto, C.; Greve, J.; Robert-Nicaud, D. J.; Arndt-Jovin, D. J.; Jovin, T. M.: Studying single living cells and chromosomes by confocal Raman microspectroscopy. Nature, vol. 347 (1990), S. 301-303.
Raman, C.V.; Krishnan, K.S.: A New Type of Secondary Radiation. Nature, vol. 121 (1928), Nr. 3048, S. 501-502.
Rhee, S.; White, J. L.: Crystal Structure, morphology, orientation, and mechanical properties of biaxially oriented polyamide 6 films. Polymer 43 (2002), S. 5903-5914.
Rull, F.; Prieto, A. C.; Casado, J., M.; Sobron, F.; Edwards, H. G. M.: Estimation of Crystallinity in Polyethylene by Raman Spectroscopy. Journal of Raman Spectroscopy 24 (1993), S. 545-550.
Sadler, G. D.; Braddock, R.J.: Oxygen Permeability of Low Density Polyethylene as a Function of Limonene Absorption: An Approach to Modeling Flavor "Scalping". Journal of Food Science 55 (1990), S. 587-588.
Schauwecker, A.; Balasubramaniam, V. M.; Sadler, G.; Pascall, M.; Adhikari, C.: Influence of High-pressure Processing on Selected Polymeric Materials and on the Migration of a Pressure-transmitting Fluid. Packaging Technology and Science 15 (2002), S. 252-262.
Schaetzel, P.; Vauclair, C.: Nguyen, Q.T.; Bouzerar, R.: A simplified solution-diffusion theory in pervaporation: the total solvent volume fraction model. Journal of Membrane Science 244 (2004), S. 117-127.
Shieh, Y.-T.; Yang, H.-S.: Morphological changes of polycaprolactone with high-pressure CO2 treatment. The Journal of Supercritical Fluids 33 (2005), S. 183-192.
Schmerder, A.: Richter T.; Langowski H.-C.; Ludwig H.: Effect of high hydrostatic pressure on the barrier properties of polyamide-6 films. Brazilian Journal of Medical and Biological Research 38 (2005), Nr. 8, S. 1279-1283.
Sfirakis, A.; Rogers, C.E.: Sorption and Diffusion of Alcohols in Amorphous Polymers. Polymer Engineering and Science 21 (1981), Nr. 9, S. 542-547.
Singhal A., Leslie J. F.: Dynamic Two-Dimensional Infra-red Spectroscopy of the Crystal-Amorphous Interphase Region in Low-Density Polyethylene. Polymer 37 (1996), Nr. 12, S. 2335-2343.
German Office Action dated Jun. 18, 2010, Application No. 10 2009 042 088.6-41, Applicant Multivac Sepp Haggenmueller GmbH & Co. KG, 5 Pages.
Submission of Opponent OI (Hiperbaric) Dated Sep. 12, 2014, Opposition Against European Patent No. EP62308325, 10 Pages.
D. Saury et al., "Flash evaporation from a water pool: Influence of the liquid height and of the depressurization rate" International Journal of Thermal Sciences 44 (2005) Elsevier SAS, pp. 953-965.
Milton R. Beychok et al., "Calculating Accidental Release Flow Rates From Pressurized Gas Systems", http://www.air-dispersion.com/feature2.html, pp. 1/4-4/4.
Amy Schauwecker, "Food Product Design: New Technologies—Jul. 2004—Under Pressure" Dated Jul. 1, 2004, httpwww.foodproductdesign/com/articles/2004/07/food-product-design-new-technologies-july-2004.aspx. pp. 1/5 to 5/5.
Elke Harms, "High-tech secures traditional product—High-Pressure Processing of packaged ready-to-eat raw ham to kill off Listeria", Fleischwirschaft international Feb. 2006, pp. 40-41.
A. Amanatidou et al., "Effect of combined application of high pressure treatment and modified atmospheres on the shelf life of fresh Atlantic salmon", Innovative Food Science & Emerging Technologies 1 (2000), pp. 87-98.
Hannes Hafsteinsson et al., Effect of high pressure processing in reducing *Listerial* spp. and on the textural and microstructural properties of cold smoked salmon (CSS), Matis Food Research, Innovation & Safety Report Summary, ISSN: 1670-7192, 44 Pages.

(56) References Cited

OTHER PUBLICATIONS

Virginia Cooperative Extension, "Novel Applications of High Pressure Processing" Commercial Fish & Shellfish Technology fact sheet, Origianlly appearing in global Aquaculture Advocate, vol. 6, Issue 3 (Jun. 2003), 4 Pages.

A. Il. Andres et al., "High-pressure treatment of dry-cured Iberian ham. Effect on colour and oxidative stability during chill storage packed in modified atmosphere" Eur Food Res Technol (2006) 222, pp. 486-491.

Submission of Opponent OII (Avure Technologies AB) Dated Oct. 6, 2014, 2014, Opposition Against European Patent No. EP62308325, 6 Pages.

Submission of Opponent OIII (Uhde) Dated Oct. 9, 2014, 2014, Opposition Against European Patent No. EP62308325, 14 Pages.

Letter of Opposition Dated May 22, 2013, filed by Hiperbaric,S.A, against, European Patent No. 2 308 325 to MULTIVAC Sepp Haggenmueller GmbH & Co. KG, Including Attachments E1-E7, 154 Pages.

Letter of Opposition Dated May 22, 2013, filed by Hiperbaric,S.A, against European Patent No. 2 308 325 to MULTIVAC Sepp Haggenmueller GmbH & Co. KG, 7 Pages.

EPO Form 2300E—20130026—filed May 22, 2013—Notice of Opposition to European Patent No. EP2308325, Date of Mention of Grant Oct. 3, 2013, Proprietor: Multivac Sepp Haggenmueller GmbH & Co. KG, Opponent Hiperbaric, S.A., 6 Pages.

Dominique Bourdet et al., Use of Pressure Derivative in Well-Test Interpreation, JournalSeek, SPE Formation Evaluation, Jun. 1989, pp. 293-302.

M.A. Freeman et al., "Laboratory Scale High Presure Food Processors", Notthingham University Press, 1995, ISBN 1-897676-506, pp. 155-166.

William O. Fellers et al., "Manufacturing Processes for Technology" Second Edition, Published: David Garza, 1995 ISBN 0-13-107791-1, http://www.prenhall.com, 11 Pages, including pp. iii-xi, 433 & 475.

Letter of Opposition filed Jul. 3, 2013 in the European Patent Office, filed by Anders Hansson on behalf of Avure Technologies, AB, against European Patent No. 2 308 325 to Multivac Sepp Haggenmueller GmbH & Co. KG, Including Attachments D1-D7, 189 Pages.

Letter of Opposition filed Jul. 3, 2013 in the European Patent Office, filed by Anders Hansson on behalf of Avure Technologies, AB, against European Patent No. 2 308 325 to Multivac Sepp Haggenmueller GmbH & Co. KG, 20 Pages.

EPO Form 2300E-71006324, filed Jul. 3, 2013—"Notice of Opposition of a European Patent", Patent No. EP2308325, Date of Mention of Grant Oct. 3, 2013, Proprietor: Multivac Sepp Haggenmueller GmbH & Co. KG, Opponent Avure Technologies AB, 5 Pages.

Barbara Franceschini et al., "Application of High Hydrostatic Pressure to Increase the Safety and the Shelf-Life of Ready-To-Each (RTE) Traditional Meals", Industra Conserve, 80 2005, ISSN: 0019-7483, pp. 391-409.

M.A. Freeman et al., "High Pressure Processing of Foods", Chapter 11—"Laboratory Scale High Pressure Food Processors", Nottingham University Press, 1995, Edited by D.A. Ledward, ISBN 1-897676-506, pp. 155-165.

Letter of Opposition dated Jul. 3, 2013, filed by Uhde High Pressure Technologies GmbH against European Patent No. 2 308 325 to Multivac Sepp Haggenmueller GmbH & Co. KG, Including Attachments E1-E9, 287 Pages.

Letter of Opposition dated Jul. 3, 2013, filed by Uhde High Pressure Technologies GmbH against European Patent No. 2 308 325 to Multivac Sepp Haggenmueller GmbH & Co. KG, 22 Pages.

EPA Formblatt 2300E—UD 40493, filed Jul. 3, 2013 Einspruch gegen ein europaisches Patent, Patent No. EP2308325, Dated Oct. 3, 2012, MULTIVAC SEPP HAGGENMUELLER GMBH & CO. KG., Uhde High Pressure Technologies GmbH, 6 Pages.

Bernadette Koltz, et al., "New Mathematical Modeling Approach for Predicting Microbial Inactivation by High Hydrostatic Pressure", Applied and Environmental Microbiology, Published Ahead of Print Feb. 9, 2007, Apr. 2007, vol. 73, No. 8, pp. 2468-2478.

G. Deplace, "Design of High Pressure Isostatic Units for Laboratory and Industrial Treatment of Food Products" (pp. 137-154), and M.A. Freeman "Laboratory Scale High Pressure Food Processors" (pp. 155-165) In "High Pressure Processing of Foods", Edited by DA Ledward, DE Johnston, RG Earnshaw, APM Hasting, Nottingham University Press 1995.

Ian L. Spain et al., "High Pressure Technology", vol. II, Applications and Processes, "Chapter 9—Isostatic Pressing" 1977, pp. 339-389.

Robert W. Van Den Berg et al., Chapter 11 "High Pressure Equipment Designs for Food Processing Application" (pp. 297-313), "Ultra High Pressure Treatments of Foods" Edited by Marc E.G. Hendrickx, Dr. ir., Series: Food Engineering Series, 2002, OX, 340. ISBN 978-1-4615-0723-9 (Seite 1 von 2—Seite 2 von 2).

F. Abe, Piezophysiology of Yeast: Occurrrence and Significance, Cellular and Molecular Biology 50 (4), ISSN 0145-568-, 2004 Cell. Mol. Biol., Cover Pages & pp. 437-445.

R. J. Ashley, Chapter 7, Permeabilty and Plastics Packaging, Metal Box Ltd. Research and Development Division, Wantage, UK, 1985, Cover Page & pp. 269-308.

C. Balny, High Pressure Enzyme Kinetics, INSERM U 128, IFR 24, CNRS, pp. 261-266. Date NA.

A. R. Berens, Diffusion of Organic Vapors at Low Concentration in Glassy PVC, Polystyrene, and PMMA*, Journal of Membrane Science, 10 (1982) Elsevier Scientific Publishing Company, Amsterdam, Cover Page & pp. 283-303.

Aaron L. Brody, Packaging of Nonthermally & Minimally Rpocessed Foods, 2005, 10.05. www.ift.ord, foodtechnology, Cover Page & pp. 75-77.

J. Comyn, Chapter 1, Introduction to Polymer Permeability and the Mathematics of Diffusion, School of Chemistry, Leicester, Polytechnic, UK, 1985, Cover Page & pp. 1-10.

Phillip T. Delassus et al., Flavor and Aroma Permeation in Barrier Film: The Effects of High Temperature and High Humidity, Nov. 1988 Tappi Journal, Cover Page & pp. 177-181.

Kornelia Eder, Beruehrungslose Temperaturmessung an Fluessigkeiten in Geschlossenen Behaeltern, Lehrstuhl Fuer Fluidmechanik und Prozessautomation der Technischen Universität Muenchen, 130 Pages. Date NA.

Neil Everall et al., Density Mapping in Poly (Ethylene Terephthalate) Using a Fiber-Coupled Raman Microprobe and Partial Least-Squares Calibation, 1996 Society for Applied Spectrocopy, vol. 50, No. 3. 1996, Cover Page & pp. 388-393.

George W. Halek and Joseph P. Luttmann, Chapter 18, Sorption Behavior of Citrus-Flavor Compounds in Polyethylenes and Polypropylenes, Effects of Permeant Functional Groups and Polymer Structure, 1991 American Chemical Society, Cover Page & pp. 211-226.

Volker Heinz and Dietrich Knorr, Chapter 4, Effects of High Pressure on Spores, Ultra High Pressure Treaments of Foods., 2002, Cover Page & pp. 77-113.

Thorsten Hupprich, Raman-Spektroskopische Untersuchungen an Alkai- und Erdalkalisilicatglaesern Bei Hohen Temperaturen, Mainz, 2001, 109 Pages.

Hwang, S.: Effect of Thickness on Permeability. In: Hopfenberg, H. B. (Hrsg.): Permeability of Plastic Films and Coatings to Gases, Vapor and Liquids. Polymer Science and Technology vol. 6. New York: Plenum Press, 1974, S. Cover Page & pp. 197-205.

Kanno C.; Mu, T.-H.; Ametani, M.; Azuma, N.: Formation of a Gel from β-Lactoglobulin under High Hydrostatic Pressure. In: Ludwig, H. (Hrsg.): Advances in High Pressure Bioscience and Biotechnology. Heidelberg: Springer, 1999, pp. 329-333.

Takehiko Kataoka et al., Permeation Equations Developled for Prediction of Membrane Performance in Pervaporation, Vapor Permeation and Reverse Osmosis Based on the Solution-Diffusion Model, Journal of Chemical Engineering of Japan, vol. 24, No. 3, 1991, Cover Page & pp. 326-333.

Ryozo Kitamaru, Phase Structure of Polyethylene and Other Crystalline Olymers by Solid-State 13C NMR, Advances in Polymer Science, vol. 137, Springer-Verlag Berlin Heidelberg 1998, Cover Page & pp. 41-102.

A.L. Kovarskii, Chapter 4, pvT Effects in Molecular Dynamics of Polymers, 1994, By CRF Press, Inc., Cover Page & pp. 117-151.

(56) References Cited

OTHER PUBLICATIONS

Krzikalla, K. I.: Hochdruckinduzierte Veränderungen von Lebensmittelinhaltsstoffen. Berlin: Technische Universität, Fakultät III—Prozesswissenschaften, Diss., 2007, 153 Pages.
J. M. Lagaron et al., Structural Characteristics Defining High Barrier Properties in Polymeric Materials, Materials Science and Technology, Jan. 2004, vol. 20, pp. 1-7.
Lambert, Y.; Demazeau, G.; Largeteau, A.; Bouvier, J.-M.: Effects of High Hydrostatic Pressure on the Aromatic Compounds of Strawberry "Coulis". In: Ludwig, H. (Hrsg.): Advances in High Pressure Bioscience and Biotechnology. Heidelberg: Springer, 1999, pp. 439-443.
Rodney C. Mason et al., Diffusion of Flabors in Polymers: Effect of Permeant Size and Shape, Jun. 1992 Tappi Journal, Cover Page & pp. 163-168.
Muneto Masuda et al., Effects of Hydrostatic Prssure on Packaging Materials for Food, High Pressure and Biotechnonogy, Eds C. Balny, R. Hayashi, K. Heremans & P. Masson, Collogue INSERM/John Libbey Eurotext Ltd, 1992, vol. 224, Cover Page & pp. 545-547.
Prof. Dr. Dipl.ing. Frank-Juergen Methner et al., Inactivation Mechanisms of Geobacillus and Bacillus Spores During High Pressure Thermal Sterilization, Berlin: Technische Universität Berlin, Fakultät III Prozesswissenschaften, Diss. 2008 D-83, 177 Pages.
B. Mertens, Hydrostatic Pressure Treatment of Food: Equipment and Processing, 1995, Cover Page & pp. 135-158.
Kajetan Mueller, O2—Durchlaessigkeit Von Kunststoffflaschen und Verschluessen—Messung und Modellierung Der Stofftrasnportvorgaenge, Wissenschaftszentrum Weihenstephan fuer Ernaehrung, Landnutzung und Umwelt Lehrstuhl fuer Brauereianlagen und Lebensmittel-Verpackungstechnik, Techniche Univresitat Munchen, Freising in Aug. 2003, 121 Pages.
M. Navaro et al., Changes in Volatile Aromatic Compounds of Strawberry Puree Treated by High-Pressure During Storage, High Pressure Research, 2002, vol. 22, Cover Page & pp. 693-696.
Shinya Ochiai et al., Packaging for High Pressure Food Processing, High Pressure and Biotechnology, Eds C. Balny, R. Hayashi, K. Heremans & P. Masson, Colloque INSERM/John Libbey Eurotext Ltd. 1992, vol. 224, Cover Page & pp. 515-519.
Patterson, M. F.; Linton, M.; McClements, J. M. J.: Pathogen Inactivation by High Pressure Treatment of Foods. In: Ludwig, H. (Hrsg.): Advances in High Pressure Bioscience and Biotechnology. Heidelberg: Springer, 1999, pp. 105-108.
A. Reps, I. Warminska-Radyko and F. Dajnowiec, Effects of High Pressure on Yoghurt. In: Ludwig, H. (Hrsg.): Advances in High Pressure Bioscience and Biotechnology. Heidelberg: Springer, 1999, pp. 453-456.
C. E. Rogers, Chapter 2, Permeation of Gases and Vapors in Polymers, Department of Macromolecular Science, Case Western Reserve University, Cleveland, Ohio, USA, 1985, Cover Pages & pp. 11-73.
Giuseppe Rossi, Macroscopic Description of Solvent Difusion in Polymeric Materials, Trends in Polymer Science, vol. 4, No. 10, Oct. 1996, Elsevier Science Ltd., Cover Pages & pp. 337-342.
Rubens, P.; Bec, N.; Lange, R.; Balny, C.; Frabj, J.; Heremans, K.: Conformational Changes of Lipoxygenase at Elevated Pressure and Temperature. In: Ludwig, H. (Hrsg.): Advances in High Pressure Bioscience and Biotechnology. Heidelberg: Springer, 1999, pp. 231-234.
DIPL.CHEM. Jens Schaube, Zuszmmenhang Von Gaspermeabilitaet und Morphologie in Zweiphasigen Elastomeren, Hannover: Universität, Fachbereich Chemie, Nov. 28, 1963, 2003, 102 Pages.
Scheibenzuber, M.: Molekulare und klinische Auswirkungen einer Hochdruckbehandlung von allergenen Lebensmitteln. München: Technische Universität, Fakultät Wissenschaftszentrum Weihenstephan für Ernährung, Landnutzung und Umwelt, Diss., 2002,139 Pages.
Schmerder, A.: Einfluss von hohem hydrostatischen Druck auf die Material und Permeationseigenschaften von Polymer-Folien. Heidelberg: Rupprecht-Karls-Universität, Naturwissenschaftlich-Mathematische Gesamtfakultät, Diss., 2004, 254 Pages.
V. P. Shantarovich et al., Chemistry of New Atoms, Positronium Annihilation Data and Actual Free-Volume Distrubution in Polymers, ISSN 0018-1439, High Energy Chemistry, 2007, vol. 41, No. 5, pp. 370-380.
Klapötke, T. M.; SPIEß, G.: Einführung in die Raman Spektroskopie. Chemie in Labor und Biotechnik 49 (1999), Nr. 9, S., Cover Pages & pp. 351-353.
S.A. Stern and V. Saxena, Concentration-Dependent Transport of Gases and Vapors in Glassy Polymers, Journal of Membrane Science, 7, (1980) Elsevier Scientific Publishing Company, Cover Pages & pp. 47-59.
R. Tangwongehai, R.; Ledward, D. A.; Ames, J. M.: Effect of High Pressure on Lipoxygenase Activity in Cherry Tomatoes. In: Ludwig, H. (Hrsg.): Advances in High Pressure Bioscience and Biotechnology. Heidelberg: Springer, 1999, pp. 435-438.
B. R. Thakur et al, High-Pressure Processing and Preservation of Food, Department of food Science, Purdue University, Food Rev. Intl, 14(4),1998, Cover Pages & pp. 427-447.
Edmund Ting et al., Determining Thermal Effects in High-Pressure Processing, Food Technology, vol. 56, No. 2, Feb. 2002, Cover Pages & pp. 31-35.
W.R. Vieth et al., Dual Sorption Theory, Journal of Membrane Science, 1 (1976), Elsevier Scientific Publishing Company, Cover Pages & pp. 177-220.
R. W. G. Van Willige et al., Influence of Flavour Absorption on Oxygen Permeation Through LDPE, PP, PC and Pet Plastics Food Packaging, Food Additives and Contaminants, 2002, vol. 19, No. 3, Cover Pages & pp. 303-313.
Richter, T.; Langowski, H.-C.: Hochdruckbehandlung von verpackten Lebensmitteln—Beurteilung flexibler, polymer Verpackungsmaterialien fuer den Einsatz in der Hochdruckpasteurisation. Der Weihenstephaner 44 (2005), Nr. 2, S. 83-86.
Richter, T.; Langowski, H.-C.: High-Pressure Processing of Packaged Food—Assessment of Flexible, Polymeric Packaging Materials for Use in High-Pressure Pasteurization. Der Weihenstephaner 44 (2005), Nr. 2, S. 83-86.
Richter, T.; Langowski, H.-C.: Hochdruckbehandlung von Lebensmitteln mit Schutzgas—Bedeutung der Verpackung. Chemie Ingenieur Technik 79 (2007), Nr 9, S. 1447.
Richter, T.; Langowski, H.-C.: High-pressure processing of food with inert gas—the importance of the packaging. P8.03. Chemie Ingeniur Technik 79 (2007), Nr. 9, S. 1447.
Richter, T.: Halbarmachung von Lebensmitteln durch Hochdruck—welchen Einfluss hat die Verpackung? 42. Kulmbacher Woche (2007), pp. 29-30.
Richter, T.: Shelf life extension of food through high-pressure processing—what influence does the packaging have? 42. Kulmbacher Woche (2007), pp. 29-30.
Ahmed, J.; Ramaswamy, H.S.; Alli, I.; Ngadi; M.: Effect of high pressure on rheological characteristics of liquid egg. Lebensmittelwissenschaft und -technologie 36 (2003), S.517-524.
Aarnoutse, P. J.; Westerhuis, J. A.: Quantitative Raman reaction monitoring using the Solvent as internal standard. Analytical Chemistry 77 (2005), S. 1228-1236.
Aska, M.; Hayashi, R.: Activation of polyphenol xxidase in pear fruits by high hydrostatic pressure. Agricultural and Biological Chemistry 55 (1991), Nr. 9, S. 2439-2440.
Assink R. A.: Plasticization of poly(dimethyl siloxane) by high-pressure gases as studied by NMR relaxation. Journal of Polymer Science Polymer—Physics Edition 12 (1974), S. 2281-2290.
Bailey, R. T.; Hyde, A. J.; Kim, J. J.; McLeish, J.: Raman studies on oriented, high Modulus, polyethylene. Spectrochimica Acta Part A: Molecular Spectroscopy 33 (1977), Nr. 12, S. 1053-1058.
Barbari, T.A.: Dual-Mode Free Volume Model for Diffusion of Gas Molecules in Glassy Polymer. Journal of Polymer Science Part B Polymer Physics 35 (1997), Nr. 11, S. 1737-1746.
Barrer R. M.; Barrie J. A.; Slater, J.: Sorption and diffusion in ethyl cellulose. Journal of Polymer Science 27 (1958), Nr. 115, S. 177-197.
Batonneau, Y.; Brémard, C.; Laureyns, J.; Merlin, J.-C.; Windig, W.: Polarization Effects of Confocal Raman Microspectroscopy of Crystal Powders Using Interactive Self-Modelling Analysis. Journal of Physical Chemistry B 107 (2003), Nr. 7, S. 1502-1513.

(56) References Cited

OTHER PUBLICATIONS

Bondar, V. I.; Kamiya, Y.; Yampol'skii, Y.-U. P.: On Pressure Dependence of the Parameters of the Dual-Mode Sorption Model. Journal of Polymer Science 34 (1996), S. 369-378.
Boyer, S. A. E.; Grolier, J.-P. E.: Modification of the glass transitions of polymers by high-pressure gas solubility. Pure and Applied Chemistry 77 (2005), Nr. 3, S. 593-603.
Boyer, S. A. E., Klopffer, M.-H., Martin, J., Grolier J.-P.: Supercritical Gas-Polymer Interactions with Applications in the Petroleum Industry. Determination of Thermophysical Properties. Journal of Applied Polymer Science 103 (2007), Nr. 3, S. 1706-1722.
Böhning M.; Goering H.; Hao N.; Mach R.; Oleszak F.; Schönhals A.: Molecular Mobility and Gas Transport Properties of Polycarbonate-based Nanocomposites. Reviewes on Advanced Materials Science 5 (2003), S. 155-159.
Budd, P. M.; McKeon, N. B.; Fritsch, D.: Free volume and intrinsic microporosity in polymers. Journal of Materials Chemistry 15 (2005), S. 1977-1986.
Bulkin, B. J.; Lewin, M.; DeBlase, F. J.: Conformational change, chain orientation, and crystallinity in poly(ethylene terephthalate) yarns: Raman Spectroscopic Study. Macromolecules 18 (1985), S. 2587-2594.
Burt, S.: Essential Oils: their antibacterial properties and potential applications in foods—a review. International Journal of Food Microbiology 94 (2004), S. 223-253.
Butz, P.; Edenharder, R.; Fernandez Garcia, A.; Fister, H.; Merkel, C.; Tauscher, B.: Changes in functional properties of vegetables induced by high pressure treatment. Food Research International 35 (2002), S. 295-300.
Caner, C.; Hemandez, R. J.; Pascall, M. A.: Effect of High-pressure Processing on the Permeance of Selected High-barrier Laminated Films. Packaging Technology and Science 13 (2000), Nr. 5, S. 183-195.
Caner, C.; Hemandez, R. J.; Pascall, M. A.; Riemer, J.: The use of mechanical analyses, scanning electron microskopy and ultrasonic imaging to study the effects of high-pressure processing on multilayer films. Journal of the Science of Food and Agriculture 83 (2003), S. 1095-1103.
Caner, C.; Hemandez, R. J.; Pascall, M. A., Balasubramaniam, V. M.; Harte, B. R.,: The effect of high-pressure food processing on the sorption behaviour of selected packaging materials. Packaging Technology and Science 17 (2004), S. 139-153.
Caner, C.; Harte, B.: Effect of high-pressure processing on the migration of antioxidant Irganox 1076 from polypropylene film into a food simulant. Journal of the Science of Food and Agriculture 85 (2005), S. 39-46.
Cheftel, J. C.: Review: High-pressure, microbial inactivation and food preservation. Food Science and Technology International 1 (1995) S. 75-90.
Chen, J.; De Wolf, I.: Theoretical and Experimental Raman Spectroscopy Study of Mechanical Stress Induced by Electronic Packaging. IEEE Transactions on Components and Packaging Technologies 28 (2005), Nr. 3, S. 484-492.
Cherukupalli S. S.; Ogale, A. A.: Online measurements of crystallinity using raman spectroscopy during blown film extrusion of a linear low-density polyethylene. Polymer Engineering and Science 44 (2004), Nr. 8, S. 1484-1490.
Cohen, M. H.; Turnbull, D.: Free-Volume Model of the Amorphous Phase: Glass Transition. Journal of Chemical Physics 34 (1961), Nr. 1, S. 120-125.
Cohen, M. H.; Turnbull, D.: On the Free-Volume Model of the Liquid-Glass Transition. Journal of Chemical Physics 52 (1970), Ni 6, S. 3038-3041.
Danch, A.; Osoba, W.; Wawryszczuk, J.: Comparison of the influence of low temperature and high pressure on the free volume in polymethylpentene. Radiation Physics and Chemistry 76 (2007), S. 150-152.
Dlubek, G.; Wawryszczuk, J.; Pionteck, J.; Goworek, T.; Kaspar, H.; Lochhaas, K. H.: High-Pressure Dependence of the Free Volume in Fluoroelastomers from Positron Lifetime and PVT Experiments. Macromolecules 38 (2005), S. 429-437.
Dobias, J.; Voldrich, M.; Marek, M.; Chudackova, K.: Changes of properties of polymer packaging films during high pressure treatment. Journal of Food Engineering 61 (2004), S. 545-549.
Enns, T.; Scholander, P.F.; Bradstreet, E.D.: Effect of hydrostatic pressure on gases dissolved in water. Journal of Physical Chemistry— vol. 69, No. 2 (1965), S. 389-391.
Eremets, M. I.: Megabar high pressure cells for Raman measurements, Journal of Raman Spectroscopy 34 (2003), Nr. 7-8, S. 515-518.
Ertl, P.; Rohde, B.; Selzer, P.: Fast Calculation of Molecular Polar Surface Area as a Sum of Fragment-Based Contributions and Its Application to the Prediction of Drug Transport Properties. Journal of Medicinal Chemistry 43 (2000), Nr. 20, S. 3714-3717.
Fernandez, P. M.: How does yeast respond to pressure? Brazilian Journal of Medical and Biological Research 38 (2005), Nr. 8, S. 1239-1245.
Fradin, J. F.; Bail, A.; Sanz, P. D.; Molina, G. A. D.: Behaviour of packaging materials during high-pressure thawing. Food Science Technology International 4 (1998), Nr. 6, S. 419-424.
Fredrickson, G. H.; Helfand, E.: Dual-mode transport of penetrants in glassy polymers. American Chemical Society 18 (1985), Nr. 11, S. 2201-2207.
Furukawa, T.; Sato, H.; Kita, Y.; Matsukawa, K.; Yamaguchi, H.; Ochiai, S.; Siesler, H. W.; Ozaki, Y.: Molecular Structure, Crystallinity and Morphology of Polyethylene/Polypropylene Blends Studied by Raman Mapping, Scanning Electron Microscopy, Wide Angle X-Ray. Polymer Journal 38 (2006), S. 1127-1136.
Galotto, M. J.; Ulloa, P. A.; Hernandez, D.; Fernandez,-Martin, F.: Mechanical and Thermal Behaviour of Flexible Food Packaging Polymeric Films Materials under High Pressure / Temperature Treatments. Packaging Technology and Science 21 (2008), S. 297-308.
Gerrard D. L.; Maddams, W. F.: Polymer Characterization by Raman Spectroscopy; Applied Spectroscopy Reviews 22 (1986), Nr. 2 & 3, S. 251-334.
Glotin M.; Mandelkern, L.: A Raman spectroscopic study of the morphological structure of the polyethylenes; Colloid and Polymer Science 260 (1982), S. 182-192.
Gohil, R. M.: Morphology-property relationships in oriented pet films : A role of in-plane crystalline orientation distribution on the film properties. Journal of Applied Polymer Science 48 (1993), Nr. 9, S. 1635-1648.
Goetz J.; Weisser H.: Permeation of aroma compounds through plastic films under high pressure: in-situ measuring method. Innovative Food Science & Emerging Technologies 3 (2002), S. 25-31.
Goworek, T.: Free volumes in solids under high pressure. Radiation Physics and Chemistry 75 (2007), S. 318-324.
Harvey, A. B.: Chemical Applications of Nonlinear Raman Spectroscopy. New York: Academic Press, 1981.
Heij de, W. B. C.; Van Schepdael, L. J. M. M.; Moezelaar, R.; Hoogland, H.; Master, A. M.; Van den Berg, R. W.: High-Presssure Sterilisation: Maximizing the Benefits of Adiabatic Heating, Food Technology 57 (2003), Nr. 3, S. 37-41.
Hirota S.-I.; Sato T.; Tominaga Y.; Asai S.; Sumita M: The effect of high-pressure carbon dioxide treatment on the crystallization behavior and mechanical properties of poly(l-lactic acid)/poly(methyl methacrylate) blends. Polymer 47 (2006), S. 3954-3960.
Ho, P.P.; Alfano, R. R.: Optical Kerr effect in liquids. Physical Review A 20 (1979), Nr. 5, S. 2170-2187.
Homma, N.; Ikeuchi, Y.; Suzuki, A.: Effect of high pressure treatment on the proteolytic enzymes in meat. Meat Science 38 (1994), S. 219-228.
Hristov, H. S.; Bolan, B.; Yee, A. F.; Xie, L.; Gidley, D. W.: Measurement of hole volume in amorphous polymers using positron spectroscopy. Macromolecules 29 (1996), Nr. 26, S. 8507-8516.
Hugas, M.; Garriga, J.; Monfort, J. M.: New mild technologies in meat processing: high pressure as a model technology. Meat Science 62 (2002), S. 359-371.
Imai, T.; Harte B. R.; Giaicin, J.R.: Partition Distribution of Aroma Volatiles from Orange Juice into selected Polymeric Sealed Films. Journal of Food Science 55 (1990), Nr. 1, S. 158-161.

(56) References Cited

OTHER PUBLICATIONS

Islam, M. A.; Buschatz, H.: Gas permeation through a glassy polymer membrane: chemical potential gradient or dual mobility mode? Chemical Engineering Science 57 (2002), S. 2089-2099.
Solms von, N.; Nielsen, K.; Hassager, O.; Rubin, A.; Dandekar, A. Y.; Andersen, S. I.: Direct Measurement of Gas Solubilities in Polymers with a High-Pressure Microbalance. Journal of Applied Polymer Science, 91 (2004), S. 1476-1488.
Solms von, N.; Rubin, A.; Andersen, S. I.; Stenby, E. H.: Directs Measurement of High Temperature/High Pressure Solubility of Methane and Carbon Dioxide in Polyamide (PA-11) using a High-Pressure Microbalance. International Journal of Thermophysics 26 (2005), Nr. 1, S. 115-125.
Smekal, A.: Zur Quantentheorie de Dispersion. Naturwissenschaften 11 (1923), Nr. 32, S. 873-875.
Snyder, R. G.; Schachtschneider, J. H.: A valance force field for saturated hydrocarbons Valence. Spectrochimica Acta 21 (1965), Nr. 1, S. 169-195.
Stern, S.A.; Frisch, H. L.: The Selective Permeation of Gases through Polymers. Annual Review of Materials Science 11 (1981), S. 523-550.
Strobl, G. R.; Hagedorn, W.: Raman Spectroscopic Method for Determining the Crystallinity of Polyethylene. Journal of Polymer Science Polymer Physics Edition 16 (1978), S. 1181-1193.
Stuart B. H.: Polymer crystallinity studied using Raman Spectroscopy. Vibrational Spectroscopy 10 (1996), S. 79-87.
Tawfik, M. S.; Devliehghere, F.; Huyghebaert, A.: Influence of D-limonene absorption on the physical properties of refillable PET. Food Chemistry 61 (1998), S. 157-162.
Tasumi, M.; Shimanouchi, T.: Crystal Vibrations and Intermolecular Forces of Polymethylene Crystals. Journal of Chemical Physics 43, Nr. 4, S. 1245-1258.
Thran, A.; Kroll, G.; Faupel, F.: Correlation Betwen Fractional Free Volume and Diffusivity of Gas Molecules in Glassy Polymers. Journal of Polymer Science, Part B., Polymer Physics 37 (1999), Nr. 23, S. 3344-3358.
Tsujita Y.: Gas Sorption and Permeation of Glassy Polymers With Microvoids. Progress in Polymer Science 28 (2003), S. 1377-1401.
Turnbull, D.; Cohen, H.: On the Free-Volume Model of the Liquid-Glass Transition. Journal of Chemical Physics 52 (1970), Nr. 6, S. 3038-3041.
Uhlemann, U.; Schmitt, M.; Oehme, K.-L.; Notni, J.; Anders, E.; Popp, J.: Introduction of a high pressure cell for use with Raman microscopy. Jorunal of Raman Spectroscopy 37 (2006), S. 442-446.
Veld P. J., Rutledge G.C.: Temperature-Dependent Elasticity of a Semicrystalline Interphase Composed of Freely Rotating Chains. Macromolecules 36 (2003), S. 7358-7365.
Veith, W.R.; Sladek, K.J.: A Model for Diffusion in a Glassy Polymer. Journal of Colloid Science 20 (1965), S. 1014-1033.
Vincenzi de, M.; Stammati, A.; Vincenti de, A.; Silano, M.: Constituents of aromatic plants: carvacrol. Fitoterapia 75 (2004), S. 801-804.
Wesch, A.; Dahmen, N.; Ebert, K.; Schoen, J.: Grenzflaechenspannungen, Tropfengroessen und Kontaktwinkel im Zweiphasensystem H2O/CO2 bei Temperaturen von 298 bis 333 K und Druecken bis 30 MPa. Chemie Ingenieur Technik 69 (1997), Nr. 7, 942-946.
Wijmans, J. G.; Baker, R.W.: The solution-diffusion model: a review. Journal of Membrane Science 107 (1995), S. 1-21.
Wijmans, J. G.: The Role of Permeant Molar Volume in the Solution-Diffusion Model Transport Equations. Journal of Membrane Science 237 (2004), S. 39-50.
Wilding, M. C.; Wilson, M.; McMillan, P. F.: Structural Studies and Polymorphism in Amorphous Solids and Liquids at High Pressure. Chemical Society Reviews 35 (2006), S. 964-986.
Williams, A.C.; Barry, B. W.: Raman Spectroscopy. Cutaneous and Ocular Toxicology 20 (2001), Nr. 4, S. 497-511.
Williams, K. P. J.; Everall, N. J.: Use of Micro Raman Spectroscopy for the Quantitative Determination of Polyethylene Density Using Partial Least-Squares Calibration. Journal of Raman Spectroscopy 26 (1995), S. 427-433.
Wunder, S. L.: Raman Spectroscopic Study of the High-pressure Phase of Polyethylene. Macromolecules 14 (1981), S. 1024-1030.
Richter, T.; Schmerder A.: Effect of High Pressure on Food Packaging Polymers—In Situ Permeation Measurements and Observations of Structural Changes. Advances on High Pressure Research—Proceedings of the 42th EHPRG Congress (2004).
Multivac Better Packaging Brochure, Success Built in, Hygienically safe. Automatically perfect. The new Multivac traysealers. MV_T700_800_Sprachen, indd 1, Jun. 15, 2009, pp. 1-20.
Multivac Better Packaging Brochure, MULTIVAC R535, Clean & clever.—The advanced Thermoformer Generation. Sep. 2008 pp. 1-24.
Shcmerder, A.; Richter, T.; Langowski, H.-C.; Ludwig, H.: Effect of high hydrostatic pressure on the barrier properties of polyamide-6 films, Brazilian Journal of Medical and Biological Research (2005) 38: 1279-1283.
Fairclough, J.P.A.; Conti, M.: Influence of Ultra-High Pressure Sterilization on the Structure of Polymer Films, Packaging Technology and Science, 2009; 22 303-310.
Corwin, H.; Shellhammer, T.H.: Combined Carbon Dioxide and High Pressure Inactivation of Pectin Methylesterase, Polyphenol Oxidase, Lactobacillus plantarum and *Esherichia coli*, JFS: Food Engineering and Physical Properties, 2002 Institute of Food Technologists, vol. 67, Nr. 2, 2002—Journal of Food Science, pp. 697-701.
Amanatidou, A.; Schueter, O.; Lemkau, K.; Gorris, L.G.M.; Smid, E.J.; Knorr, D.: Effect of combined application of high pressure treatment and modified atmospheres on the shelf life of fresh Atlantic salmon, Innovative Food Science & Emerging Technologies 1 (2000) 87-98.
Park, S.-J.; Lee, J.-I.; Park, J.: Effects of a Combined Process of High-Pressure Carbon Dioxide and High Hydrostatic Pressure on the Quality of Carrot Juice, JFS: Food Engineering and Physical Properties, 2002 Institute of food Technologists, vol. 67, Nr. 5—2002—Journal of Food Science, pp. 1827-1834.
Andres, A. I.; Adamsen, C.E.; Moller, J. K. S.I.; Ruiz, J.; Skibsted, J. H.: High-pressure treatment of dry-cured Iberian ham. Effect on colour and oxidative stability during chill storage packed in modified atmosphere, Eur Food Res Technol (2006) 222: 486-491, DOI 10.1007/s00217-005-0176-x.
Flick Jr., G.: CFAST Novel Applications of High Pressure Processing, Virginia Cooperative Extension, Commercial Fish & Shellfish Technology fact sheet, Global Aquaculture Advocate, vol. 6, Issue 3 (Jun. 2003), 4 Pages.
Richter, T.: Technische Universitat Munchen, Lehrstuhl fuer Lebensmittelverpackungstechnik, Der Einfluss hohen hydrostatischen Drucks auf polymere thermoplasticsche Lebensmitteleverpackungen. genehmigten Dissertation. pp. I-XVII and 1-154, Dissertation of Inventor Tobias Richter submitted to the University of Munich on Feb. 23, 2011 and published May 6, 2011.
Park, S.-J.; Park, H-W.; Park, J.: Inactivation Kinetics of Food Poisoning Microorganisms by Carbon Dioxide and High Hydrostatic Pressure, JFS: Food Microbiology and Safety—2003 Institute of Food Technologists, Journal of Food Science—vol. 68, Nr. 3, 2003, pp. 976-981.
Ballestra, P.; Abreu Da Silva, A.; Cuq, J.L.: Inactivation of *Escherichia coli* by Carbon Dioxide Under Pressure, vol. 61, No. 4, 1996—Journal of Food Science. pp. 829-831.
Parton, Tiziana; Bertucco, Alberto; Elvassore, Nicola; Grimolizzi, Luana: A continuous plant for food preservation by high pressure CO2, ScienceDirect, Journal of Food Engineering 79 (2007) 1410-1417.
European Search Report dated Dec. 14, 2010, Application No. 10 009 644.5, 4 Pages.

\* cited by examiner

DEVICE AND METHOD FOR THE HIGH-PRESSURE TREATMENT OF PRODUCTS

CROSS-REFERENCE TO RELATED APPLICATIONS

This application is a continuation of U.S. application Ser. No. 12/884,841 filed Sep. 17, 2010, which issued as U.S. Pat. No. 8,771,773 on Jul. 8, 2014, which claims foreign priority benefits under 35 U.S.C. § 119(a)-(d) to German patent application number DE 102009042088.6, filed Sep. 18, 2009, which are incorporated by reference in their entirety.

TECHNICAL FIELD

The present disclosure relates to a device and to a method for the high-pressure treatment of products, particularly of packaged foodstuffs.

BACKGROUND

Foodstuffs are subject to chemical and biological processes that can change their composition and can also produce substances harmful to health. For example, the foodstuffs may oxidize or they may be modified by enzymes and microorganisms, e.g. mold fungi. These processes must be prevented or at least delayed within the desired storage life so that foodstuffs can be safely consumed by the consumer, transported and kept stable as long as possible.

One possibility is that foodstuffs are strongly sugared, salted or dried to remove water from the foodstuff, thereby preventing the development of microorganisms, such as mold fungi or bacteria. The addition of alcohol or vinegar, the addition of preservatives and also cooling decelerate the development of microorganisms and reduce enzyme activity. Furthermore, a heat treatment can ensure that microorganisms are killed and harmful enzymes are inactivated. During pasteurization the foodstuff is heated to a temperature below 100° C. for some time. In this process, however, the comparatively resistant bacterial spores continue to be viable, and there is the risk that important nutrients and flavors are destroyed by the heat treatment.

A further method for prolonging the stability of foodstuffs consists in filling the foodstuffs into a gastight packaging and to evacuate the packaging before closing or sealing. Optionally, a protective gas or protective-gas mixtures, e.g. with nitrogen or $CO_2$, may be added to the packaging. The activity of enzymes or microorganisms is slowed down by the displacement of air, e.g. of oxygen.

A method that has so far hardly been used—at least on an industrial scale—is the high-pressure treatment of foodstuffs. In this method a foodstuff that is normally already packaged is subjected to very high pressures of typically 400 MPa to 600 MPa for some time, for example for a few minutes. These high pressures ensure that harmful microorganisms are destroyed and killed in the foodstuff. By contrast, small molecules, e.g. vitamins, which define flavor and nutritional value of the foodstuff, are hardly altered by the high-pressure treatment. In meat products the stability can thus be prolonged for instance by the factor 6 to 10 as compared with the untreated product.

The high-pressure treatment offers various advantages over a heat treatment. For instance, the flavor is hardly changed and the vitamin content in the foodstuff is sometimes more than twice as high after a high-pressure treatment than after a heat treatment. Some heat-sensitive products, e.g. seafood, do not at all permit a heat treatment. Pathogenic germs, such as listeriae, can be killed off in a reliable way, so that the food safety is enhanced. With the high-pressure treatment, however, the internal structure of the foodstuffs can also be varied in a targeted way, resulting in novel product options, e.g. by gelling fruit preparations without any heat. Finally, the high-pressure treatment technology is already acknowledged in many countries to be (food) safe.

In the high-pressure treatment of packaged foodstuffs, problems with the packaging may arise due to the process conditions. For instance, optically disadvantageous changes and also damage may occur. Special packs with a protective-gas atmosphere pose problems due to the strongly compressible gas amount inside the package. During the high-pressure build-up and the pressure holding period, gas molecules also move into the plastic or into a film, of which the packaging of many foodstuffs is normally made. With a fast pressure reduction from e.g. 600 MPa to about 0.1 MPa ambient pressure the volume and the aggregate state, respectively, of the gas molecules changes at a faster rate than the rate at which said molecules can exit out of the film back into the interior of the packaging. The structure of the film may here get damaged. This results in optical flaws, but also in leakage within the packaging. Likewise, the product itself may get damaged due to exiting gas molecules that have passed into the product during the high-pressure treatment. This is also why vacuum packs have so far predominantly been used in high-pressure treatment.

The inactivation of microorganisms as well as the structural modification of foodstuff constituents are e.g. described in EP 0 588 010 A1, EP 0 689 391 B1, EP 0 752 211 B1, EP 1 100 340 B1, DE 42 26 255 A1, or DE 37 34 025 C2, EP 1 112 008 B1, EP 1 201 252 B1, DE 196 49 952 A1, DE 197 38 800 A1, DE 199 39 677 A1 and DE 26 11 389 A1 describe the impacts of high-pressure treatments on the microbiological stability and safety of foodstuffs. The application of the high-pressure treatment specifically to meat products is described in DE 198 01 031 C2, DE 1 965 36 C1, EP 0 748 592 B1, EP 0 683 986 B1, DE 101 01 958 A1, DE 10 2005 011 868 A1, or WO 2006/097248 A1.

A generic device and a generic method are revealed in WO 2006/129180 A1. A line with two shut-off valves that are arranged one after the other is here provided for discharging the high-pressure medium out of a high-pressure container. A buffer container may additionally be disposed between the two shut-off valves for receiving the high-pressure medium. It is the objective of this system design to reduce the pressure difference on an opened discharge valve so as to prevent cavitation on the valve. During normal operation the one shut-off valve is first opened for this purpose so as to accommodate high-pressure medium in the buffer container. After the first discharge valve has been closed, the downstream second discharge valve is opened to discharge the high-pressure medium at least in part. A drawback is however that the clock cycles of this conventional high-pressure treatment system are very long—WO 2006/129180 A1 indicates a cycle time of more than one hour. Such cycle times are not profitable on an industrial scale. Moreover, neither WO 2006/129180 A1 nor the remaining prior art furnishes information as to how the high-pressure treatment could e.g. be combined with the protective gas treatment of foodstuffs.

SUMMARY

It is an object of the present disclosure to provide a method and a device which under efforts that are as small as possible in terms of construction nevertheless permit a high-pressure treatment of products that is also profitable on an industrial scale, and which can also be adapted to different products, if possible, particularly also to products treated with a protective gas.

The device according to the disclosure is provided with a controllable actuator by means of which the rate of the pressure decrease inside the high-pressure chamber is adjustable at least over a predetermined pressure range. To this end a proportional valve, preferably a needle valve, with a pressure range of 100 MPa to 0.1 MPa, particularly of 50 MPa to 0.1 MPa, can e.g. be used. This makes it possible to adjust the pressure decrease rate such that despite a high optimal process speed and thus a short cycle time the pressure decrease rate can be reduced within specific pressure ranges in a controlled way. Adverse effects that are detrimental within these pressure ranges on the product or the packaging due to an excessively fast pressure reduction are thereby prevented. For instance, it has been found that in packs in which a product and a protective gas atmosphere are present, an excessively fast pressure reduction leads to undesired changes on the product and to partly irreversible damage to the packaging or even to an increased gas permeability of the packs. This impairs the protection and the stability of the products considerably. During high-pressure impacts the protective gases are strongly compressed, liquefied or are in a liquid-like, so called supercritical, state. It has been found that the prevention of such damage does not require a slowing down of the whole pressure decrease from the high-pressure maximum to the normal pressure, but the reduction of the pressure decrease rate over a limited pressure range is adequate for preventing damage to the packaging. A detailed analysis reveals that this is the pressure range in which the gas diffusing into the films of the packaging during pressure treatment spontaneously exits out of the film, thereby damaging the film locally. This is presumably intensified by the renewed transition of the pressure-liquefied gases into the gaseous state and the resulting increase in volume in the critical pressure range of 50 MPa to 0.1 MPa. With the invention it is possible to reduce the pressure decrease rate exactly within this critical range in a controlled way, but otherwise to maintain a high pressure decrease rate for achieving a short cycle time.

The critical pressure range over which the pressure decrease rate should be reduced for preventing damage to the packaging can depend on the gases used and on the materials of the packaging and also on the product properties, e.g. on the arrangement of the films in a multilayered packaging material. Ideally, the pressure range within which the controllable actuator can reduce the pressure decrease rate is therefore adjustable.

Treatment-induced damage to the packaging can be kept small to a particularly high degree if the actuator is continuously adjustable so that the rate of the pressure decrease is also continuously adjustable.

In one embodiment, the adjustable actuator is configured as a proportional valve, for instance as a needle valve which can be controlled electronically with a servomotor or pneumatically.

In another embodiment, the adjustable actuator comprises a pressure transformer. This transformer may e.g. be a piston that is freely movable in a cavity. With the help of the pressure transformer a counter-pressure can be applied relative to the (residual) pressure prevailing in the high-pressure container. The pressure transformer makes it possible that the medium (such as compressed air) which is used for generating the counter pressure may have a considerably lower pressure than the high-pressure medium itself.

The actuator can be handled in a particularly simple way if it is controllable, e.g., hydraulically, by means of the pressure prevailing in a pressure line leading to the actuator. In particular, the pressure of the counter-pressure medium prevailing on the actuator can here be used.

Preferably, the counter-pressure medium applied to the actuator is compressed air controlling the actuator because this compressed air can be handled in a technically comparatively easy way.

The discharge valve of the device according to the present disclosure may be a check valve. This check valve can be set such that it opens above a predetermined, optionally variable, pressure threshold. The high-pressure medium can thereby be discharged rapidly out of the high-pressure chamber until it reaches the predetermined threshold value of the pressure, starting from the maximum pressure. The excessively fast, uncontrolled reduction of the pressure below the threshold value is thereby prevented in a technically simple way. Instead of the check valve, a controlled valve could also be used that is switched depending on the pressure sensor signal.

It is expedient when a shut-off valve is provided between the high-pressure chamber and the discharge valve, so that the discharge valve is only acted upon with the pressure of the high-pressure medium when the high-pressure medium is really to be discharged.

In an advantageous variant of the present disclosure a three-way valve is provided between the high-pressure chamber and the discharge valve. In its different positions the three-way valve can either be closed, release the path leading to the discharge valve, or release another path.

It is particularly possible that a first outlet of the three-way valve leads to the discharge valve and a second outlet of the three-way valve to the actuator. It is thereby made possible that the pressure of the high-pressure medium can be applied selectively and separately either to the discharge valve or to the actuator. It is thereby possible to reduce the pressure over a first pressure range by means of the discharge valve at a fast pace up to an optionally variably adjustable pressure threshold and to reduce the pressure over a different pressure range by means of the actuator in a controlled way.

In a different variant an actuator directly acts on the discharge valve. For instance, the actuator can vary the pressure threshold at which the outlet valve opens or it can effect a change in the opening cross-section of the discharge valve.

The present disclosure also refers to a method for the high-pressure treatment of products, particularly of packaged foodstuffs, with the pressure reduction of the pressure taking place in a high-pressure chamber in a first phase and in a second phase, and the mean pressure decrease rate in the first phase being higher than in the second phase. As has already been described, with a suitable selection of the pressure ranges, this can prevent the generation of treatment-induced damage to the product and/or on packs. For instance, the pressure can be reduced in a first phase very rapidly while pressure reduction in a second phase is carried out at a considerably reduced rate. In the second phase, e.g. a gas that has penetrated into the material of the packaging in the pressure holding phase can slowly escape out of the packaging and the product without locally damaging the same. The method can be used not only for vacuum packs, but also for protective-gas packs.

Treatment-induced damage can be prevented in a particularly efficient way if the rate of the pressure decrease is continuously controllable.

It is possible that the second phase is followed by a third phase in which the mean pressure decrease rate is again higher than in the second phase. This possibility by which the cycle time of the method can be reduced is particularly recommended if damage takes place that is only treatment-induced within a determined pressure range, which damage can be prevented by reducing the pressure decrease phase in this range.

In a variant of the method the pressure decrease rate is controlled at least in the second phase by means of a controllable actuator, the actuator being controllable particularly continuously. When in the second phase the actuator has to determine the pressure decrease rate at an already lower counter-pressure, it may be of a technically simple design because it is not exposed to the high maximum pressure of the high-pressure chamber. Optionally, a second pressure sensor can be used that in the pressure range in which the actuator controls the pressure decrease shows a particularly high measuring accuracy so as to be able to control the actuator in a correspondingly precise way.

In one embodiment, the actuator comprises a pressure transformer, and the counter-pressure applied to the actuator is reduced continuously at least via a predetermined pressure range. For instance, treatment-induced damage can be prevented, which damage would be caused by a sudden pressure decrease.

In another variant, the present disclosure relates to a device for the high-pressure treatment of products with a high-pressure chamber that can be closed in a pressure-tight way by at least one stopper, with the device comprising a vent hole. With this vent hole the high-pressure chamber can be vented even if the high-pressure chamber is already closed by means of the at least one stopper even if the stopper is not yet necessarily pressure-tight. After the products to be treated have been introduced into the high-pressure chamber, the chamber is normally filled with a pressure medium. While the high-pressure treatment device is filled with high-pressure medium, normally water, the air contained in the high-pressure chamber can escape via the vent hole, so that the high-pressure chamber can be filled in a quasi airless way.

The vent hole (or the vent holes if there are several) should be closable in a high-pressure-tight manner so as to prevent the escape of high-pressure medium out of the high-pressure chamber.

It is advantageous when the vent hole is arranged in the upper region of the high-pressure chamber, so that the air still contained in the high-pressure chamber can rise up to the vent hole.

In a method corresponding to this variant of the present disclosure and used for the high-pressure treatment of products, the high-pressure chamber is vented after the pressure-tight closing of the at least one stopper and during the filling of the high-pressure chamber with a high-pressure medium. The quasi airless filling of the high-pressure chamber with the high-pressure medium facilitates the generation of the pressure needed for the treatment of the products.

In a variant of this method, the at least one stopper has an opened position and a first and second closed position, wherein the stopper is moved from the first closed position to the second closed position in a volume-reducing way further towards the high-pressure chamber after the venting of the high-pressure chamber has been terminated. Owing to this process a pre-pressure already builds up in the high-pressure chamber before the beginning of the actual high-pressure generation. The pre-pressure that is solely generated by the second closing movement of the stopper can pre-compress the highly compressible gas present in protective-gas packs, thereby enhancing the efficiency of the method and the device, respectively, and reducing the process time.

An advantageous embodiment of the present disclosure shall now be explained in more detail with reference to a drawing.

DETAILED DESCRIPTION

Like components are provided with like reference signs throughout the figures.

Figure 1:
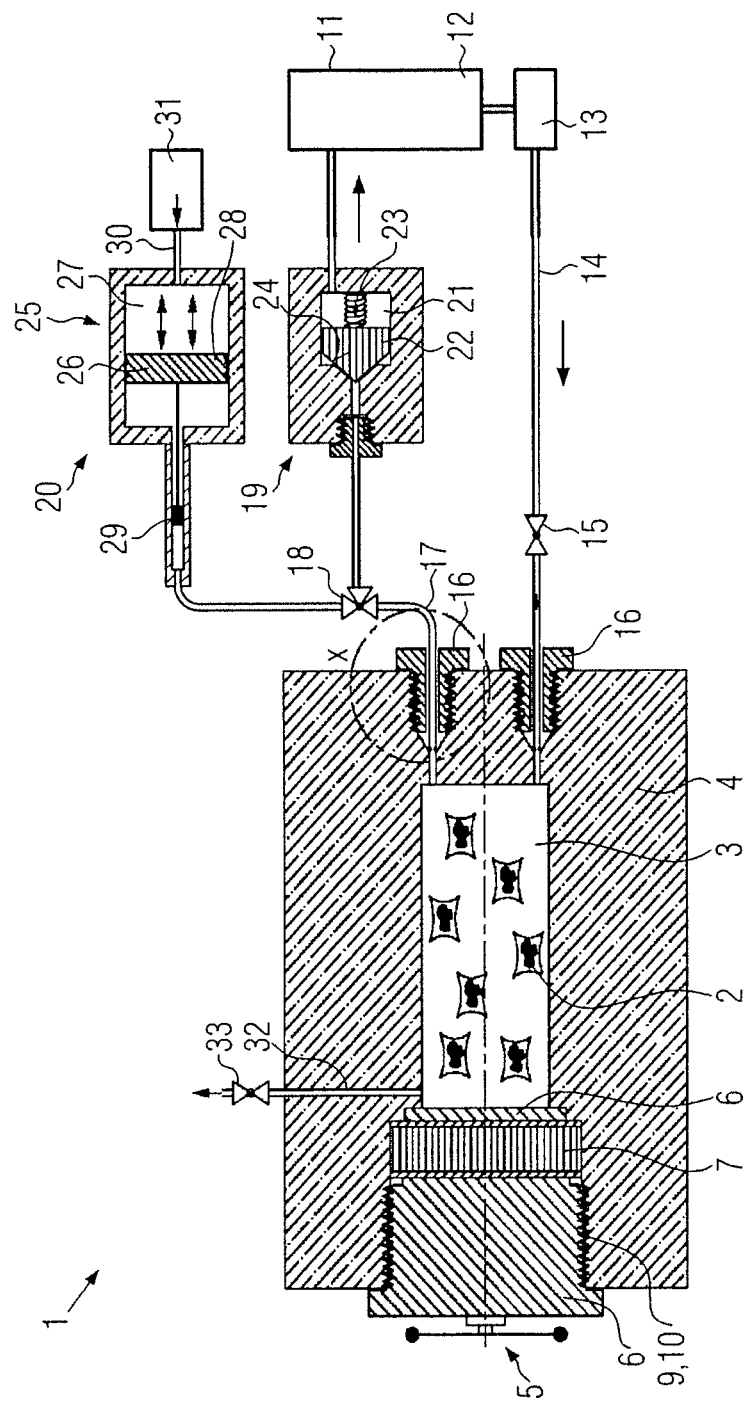
FIG. 1 shows a first embodiment of a device according to the present disclosure for the high-pressure treatment of products.

FIG. 1 schematically shows components of a first embodiment of a device 1 according to the present disclosure for the high-pressure treatment of products 2. The products 2 may be packed foodstuffs for example. To be more specific, the foodstuff 2 can be present in a gastight packaging in the case of which the air inside the packaging has been replaced by a protective gas, for instance oxygen or $CO_2$, prior to the gas-tight closing. The device 1 according to the invention, however, can also be used for a high-pressure treatment of other products 2.

The device 1 comprises an autoclave with a high-pressure chamber 3 in which the products 2 are subjected to high-pressure treatment. The high-pressure chamber 3 is large enough to be able to accommodate a plurality of products 2 at the same time. A comparatively thick-walled cylindrical chamber wall 4 surrounds and defines the high-pressure chamber 3.

The high-pressure chamber 3 is accessible through at least one, preferably two filling or unloading openings 5 in the chamber wall 4. In FIG. 1, the filling opening 5 is closed by means of a stopper 6 which comprises a sealing system 7 and closes the high-pressure chamber 3 in a pressure-tight manner. The stopper 6 is in engagement via an external thread 9 with an internal thread 10 in the chamber wall 4. With the help of a rotary handle 11, but preferably by means of a motor, the stopper 6 can be screwed into the internal thread 10 such that it can be brought from an opened position into a first closed position in which the stopper 6 seals the high-pressure chamber 3 to prevent the exit of high-pressure medium, and further into a second closed position in which the high-pressure chamber 3 is closed in a high pressure-tight way.

Furthermore, the device 1 has a reservoir 11 for a high-pressure medium 12, which is typically water or any other suitable fluid. With the help of a high-pressure pump 13, which communicates with the reservoir 11, the high-pressure medium 12 can be conveyed via a transport line 14 into the high-pressure chamber 3. In the transport line 14 a check valve 15 is provided for preventing back-flow of the high-pressure medium 12 out of the high-pressure chamber 3. The transport line 14 is connected and secured via a retaining nut 16 to the chamber wall 4. Details of this connection shall be explained later with reference to FIG. 2.

A discharge line 17 is connected via a constructionally identical retaining nut 16 to the chamber wall 4 such that it is in fluid communication with the high-pressure chamber 4. After the high-pressure treatment has been performed, the high-pressure medium 12 can again be discharged via the discharge line 17 out of the high-pressure chamber 3. A three-way valve 18 is provided in the discharge line 17. While a first outlet of the three-way valve leads to a discharge valve 19 implemented as a check valve, a second outlet of the three-way valve 18 leads to an actuator 20. The three-way valve can assume a first position in which it closes the discharge line 17. Thus the three-way valve 18 serves as a shut-off valve in this instance. In a second position it opens the discharge line 17 towards the discharge valve 19 while it opens the discharge line 17 in a third position towards the actuator 20.

The discharge valve 19, which is configured as a check valve, comprises a valve body 22 which is displaceably supported in a valve chamber 21. A counter-pressure mechanism 23, e.g. an adjustable pneumatic pressure cylinder, acts on the valve body 22 and holds it against a valve seat 24 formed to be complementary to the valve body 22. While actuated by the pressure of the high-pressure medium 12 in the discharge line 17 the valve body 22 can move back against the force of the counter-pressure mechanism 23 out of the valve seat 24 so as to release an opening and to permit the outflow of the high-pressure medium 12. The size of the opening defines the outflow rate and thus the pressure decrease rate.

The controllable actuator 20 comprises a pressure transformer 25. The pressure transformer 25 comprises a piston 26 which inside a piston chamber 27 is freely reciprocating, as is outlined by the two arrows. The piston 26 has a first end 28 with a large cross-sectional area and a second end 29 with a small cross-sectional area. The piston side 29 is positioned inside a form-fit duct. The piston tip is provided with a high pressure-fit seal that prevents an outflow of the pressure medium into the piston chamber 27.

The piston length in the duct determines the maximally possible volume by which the chamber can be "extended". Hence, liquid is removed from the chamber in a controlled way and the pressure is thereby reduced—at the latest until the piston travel is at its end stop. The piston length must therefore be configured with an adequate stroke.

The discharge line 17 is connected to the actuator 20 in such a way that it ends on the second end 29 of the piston 26 in the case of a correspondingly opened three-way valve 18. At the opposite side of the piston 26 the piston chamber 27 is in communication with a counter-pressure generator 31 via a pressure line 30. The counter-pressure generator may be a compressed-air source acting on the first end 28 of the piston in the piston chamber 27 with compressed air. The magnitude of the counter pressure can here be continuously variable so as to vary the position of the actuator 20 also continuously, namely particularly the position of the piston 28 in the actuator 20.

Furthermore, a vent hole 32 is provided in the chamber wall 4 of the device 1. It begins in an upper region of the high-pressure chamber 3 and leads from there via a high-pressure-resistant vent valve 33 to the outside. The high-pressure chamber 3 can comprise a plurality of such vent holes 32.

Figure 2:
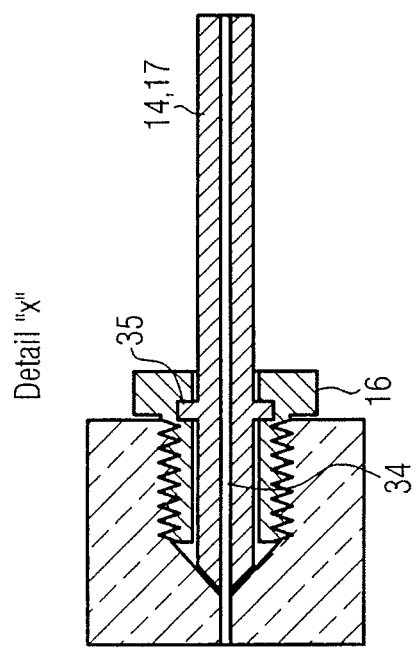
FIG. 2 is a magnification of the detail "X" of FIG. 1.

FIG. 2 shows a magnification of the detail "X" in FIG. 1, i.e. the connection of the transport line 14 and the outlet line 17, respectively, to the chamber wall 4. At this place a recess 34 is provided with a conically converging end in the chamber wall 4. The transport line 14 and the discharge line 17, respectively, are configured such that the end thereof shows the same conicity as the conicity of the bottom of the recess 34. With its end the line 14, 17 is inserted into the recess 34 such that the conical end thereof rests on the conical bottom of the recess 34. A retaining nut 16 provided with an external thread is screwed into the recess 34. The retaining nut 16 is supported on a projection 35 that projects from the outside of the line 14, 17. With the help of the force exerted by the retaining nut 16 on the projection 35, the line 14, 17 is retained in the recess 34. As soon as the high-pressure medium 12 is passed through the line 14, 17, the high-pressure medium presses the conical front end of the line 14, 17 to the outside so as to ensure a high-pressure tight contact of the front end of the line 14, 17 on the conical bottom of the recess 34.

Figure 3:
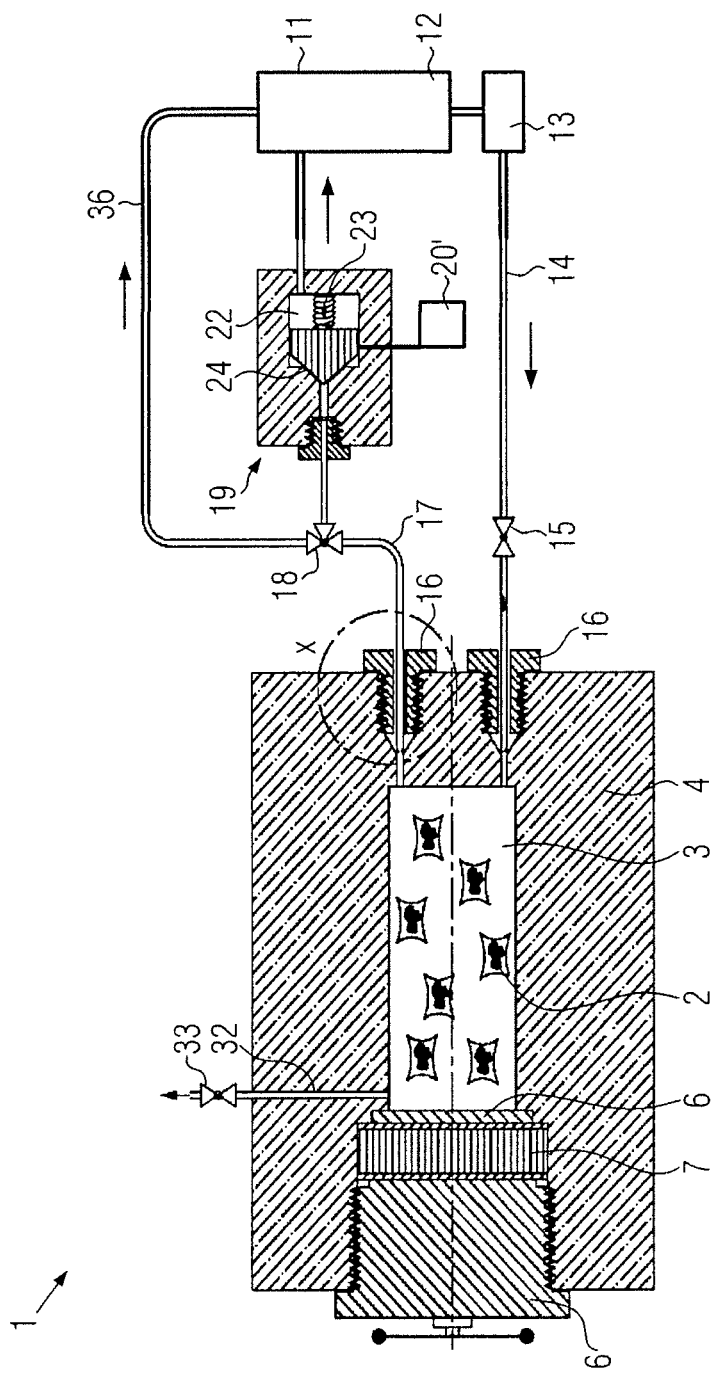
FIG. 3 shows a second embodiment of a device according to the present disclosure.

FIG. 3 shows a second embodiment of a device 1 according to the present disclosure for the high-pressure treatment of products 2, particularly packaged foodstuffs. It is identical to the embodiment shown in FIG. 1, except for the differences shown hereinafter. The actuator 20' is not in parallel with the discharge valve 19 in this embodiment, but is directly acting on the discharge valve 19. For instance, the actuator 20' can comprise an electric motor with or without a gearbox that acts on the valve body 22. Upon actuation of the actuator 20' the valve body 22 can be moved out of the valve seat 24 against the force of the counter-pressure mechanism 23 so as to release an outflow opening. The size of the outflow opening and thus the outflow rate are continuously adjustable via the displacement path of the valve body 22.

While the inlet of the three-way valve 18 is in communication with the discharge line 17, the first outlet of the three-way valve 18 continues to be in communication with the discharge valve 19. By contrast, the second outlet now leads to a bypass line 36, which leads from the three-way valve 18 (possibly via a check valve, which is not shown) into the reservoir 11.

The operation of the device 1 of the invention and the sequence of the method according to the invention shall be described in the following in an exemplary way.

At the beginning the high-pressure chamber 3 of the device 1 is empty and opened. Products 2, e.g. protective gas packed foodstuffs, are filled into the high-pressure chamber 3. To this end a transport container (not shown) may be provided for accommodating a multitude of products 2, and the container is possibly automatically introduced into the high-pressure chamber 3.

Figure 4:
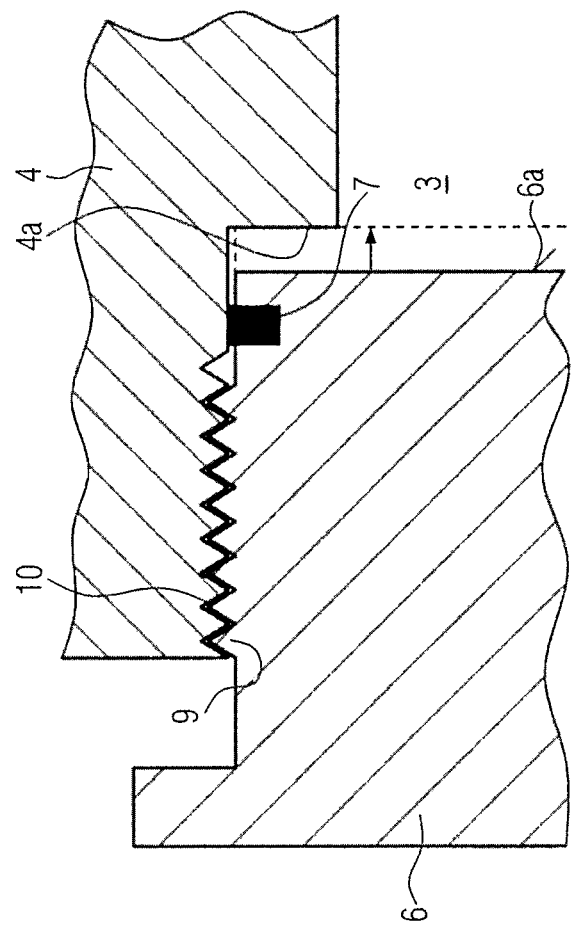
FIG. 4 is a magnification showing the engagement between a stopper and a chamber wall.

In the next step, the stopper 6 is brought from its opened position into a first closed position, which is shown in unbroken line in FIG. 4. In this first closed position, the stopper 8 closes the high-pressure chamber 3 already in a leakage-tight way, but has not yet reached its final, high-pressure-fit closing position. As soon as the stopper 8 has assumed the first closed position, high-pressure medium 12 is filled or introduced into the high-pressure chamber 3 via the transport line 14, i.e. the high-pressure chamber 3 is flooded. The vent valve 33 is opened, so that the air still contained in the high-pressure chamber 3 can escape via the vent hole 32. When air is no longer contained in the high-pressure chamber 3, the vent valve 33 is closed.

The stopper 6 (or the stoppers 6 if several are present) moves now from its first closed position into its second closed position and is locked in a high-pressure-resistant way to prevent any slipping out. This reduces the volume of the high-pressure chamber 3, so that the pressure in the high-pressure medium 12 rises to a pre-pressure stage. At this pre-pressure the protective gas contained in the products 2 in case of need is compressed. The second closed position of the stopper 6 is shown in dashed line in FIG. 4. The stopper 6 is moved from the first closed position by movement in the direction of the high-pressure chamber 3 to its second closed position. In the second closed position the flat front side 6a of the typically metallic stopper 6 rests on a shoulder 4a of the e.g. also metallic wall 4 of the high-pressure chamber 3. Due to this contact the high-pressure chamber 3 is sealed in a high-pressure-tight way. Due to the pressure prevailing inside the high-pressure chamber 3, the front side 6a of the stopper 6 could concavely deform so as to enhance the sealing action even further.

Subsequently, the high-pressure pump, or a plurality of series-connected pumps 13, passes into the high-pressure mode. The pressure inside the high-pressure chamber 3 rises to several 100 MPa, e.g. between 300 MPa and 700 MPa. This pressure is maintained for some time, e.g. for 2 to 4 minutes.

Following the high-pressure treatment the pressure is reduced. In the first phase of the pressure decrease the three-way valve 18 is opened towards the discharge valve 19 while its outlet to the actuator 20 is closed. The pressure of the high-pressure medium 12 from the high-pressure chamber 3 is applied to the discharge valve 19. Under the action of this pressure the valve body 22 is moved out of the valve seat 24, so that the discharge valve 19 opens. The high-pressure medium 12 can now flow back via the discharge valve 19 into the reservoir 11. This process lasts for 1 to 2 seconds only.

At a predetermined threshold value the pressure is no longer adequate for keeping the valve body 22 in an opened state. The counter-pressure mechanism 23 recloses the discharge valve 19. At this moment the three-way valve 18 is switched over, so that the discharge line 17 is now exposed to the actuator 20. The first outlet to the discharge valve 19 is closed.

In the meantime the counter-pressure generator 31 has built up a counter pressure in pressure line 30, the counter pressure withstanding the residual pressure of the high-pressure medium 12 in the high-pressure chamber 3. The piston 26 is shifted by the pressure of the counter-pressure generator 31 to the left side as far as possible. With the help of the pressure transformer 25, i.e. the differently large surfaces of the two ends 28, 29 of the piston 26, a comparatively low pressure of the counter-pressure generator 31 is already enough for withstanding the distinctly higher pressure of the high-pressure medium 12.

The pressure of the counter-pressure generator 31 is now reduced slowly and in a continuously controlled way so as to move the piston 26 slowly to the right side. Due to the further flow of the high-pressure medium 12, the pressure inside the high-pressure chamber 3 is decreasing. In this second phase of the pressure decrease the pressure decrease rate can be considerably lower than in the first rapid phase of the pressure decrease—or the pressure can even be kept at a constant value for a specific period of time. This permits a smooth transition over a critical pressure range in which otherwise, with an excessively rapid pressure decrease, undesired damage and adverse effects on the products 2 or on the packaging of the products 2 might occur.

In the embodiment according to FIG. 3, the pressure decrease in the second phase takes place in that the actuator 20' opens the discharge valve 19 mechanically, with the size of the opening between the valve body 22 and the valve seat 24 determining the pressure decrease rate. The pressure inside the high-pressure chamber 3 could thereby be lowered slowly over the critical pressure range. In the embodiment of FIG. 3, a high pressure decrease rate can be achieved again in a third phase of the pressure decrease in that the three-way valve 18 is opened towards the bypass line 36. The high-pressure medium 12 can now flow back relatively rapidly from the high-pressure chamber 3 into the reservoir 11 via the bypass line 36. In the embodiment of FIG. 1 a corresponding bypass line 35 may also be provided.

Figure 5:
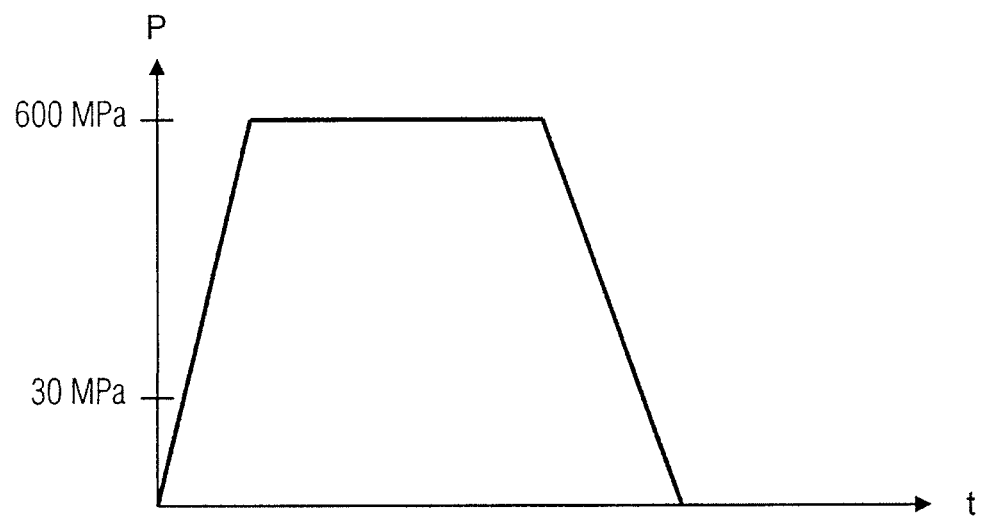
FIG. 5 is a P-t diagram (i.e. a pressure-time diagram) on the prior art.

FIG. 5 shows a pressure curve according to the prior art for the high-pressure treatment of vacuum packs. The pressure in the high pressure chamber 3 is here raised to the necessary pressure, e.g. 600 MPa, and kept at this level for a predetermined period of time. Subsequently the pressure in the chamber is quickly reduced by discharging the high-pressure medium 12. The shut-off valve, the lines, particularly the cross sections of the lines, line lengths and line bends as well as other flow resistances are of importance to the pressure progress during the reduction of the pressure. A control is here not intended.

Figure 6:
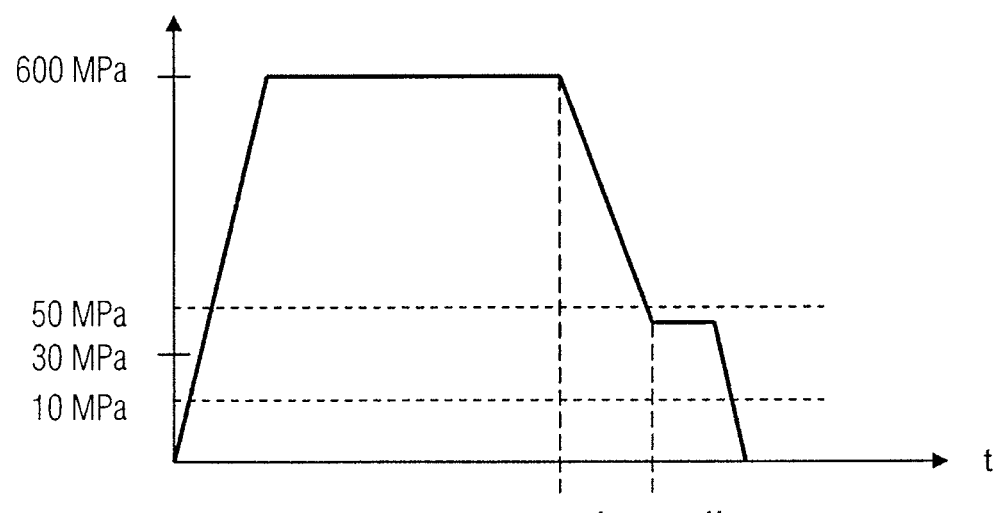
FIG. 6 is a P-t diagram with a pressure curve according to the present disclosure.

FIG. 6 shows a pressure curve during the pressure reducing process according to the disclosure. After a fast pressure decrease in the first phase I the pressure reduction is controlled in a second phase II, depending on product, gas mixture and packaging film, in the critical range between about 50 MPa and 5 MPa in such a way that the pressure is kept at a second lower level for such a long time that the gas molecules can diffuse out of the packaging film and the product into the interior of the packaging. In this range the gas molecules are still in an aggregate state or have a volume that does not cause damage to the packaging film and the product during diffusion. Instead of a packaging film in the form of a plastic film or a film composite, other known and suited packaging materials may be used.

The advantage of this pressure progress is that the conventional pressure reduction according to the prior art is only carried out up to a pressure greater than 50 MPa. Pressure sensors needed for this and used for sensing a chamber pressure, which are also suited up to 1000 MPa, normally show a measurement tolerance of about 10 MPa which is not suited for the small critical range. Therefore in good time before the critical range a control operation with the help of a proportional valve (not shown in the figures) is chosen in order to carry out the pressure reducing process in an adjustable way, as is e.g. shown in FIGS. 6 to 9. With a proportional valve a continuous adjustment of the pressure reducing process can be carried out. This configuration represents a very economic solution. However, a variant with a continuous adjustment over the whole range is also feasible, e.g. with a proportional valve.

Figure 7:
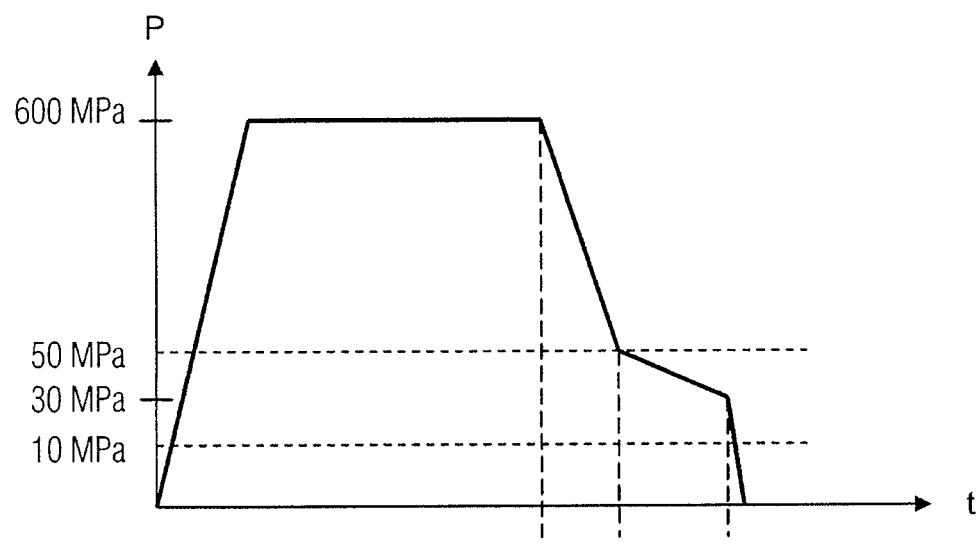
FIG. 7 is a P-t diagram with an alternative pressure curve.

FIG. 7 shows an alternative pressure curve according to the present disclosure in the critical range in which the pressure is not maintained, but the pressure is reduced at a strongly decelerated rate in the second phase II until the critical range is left, and a final fast pressure reduction can be carried out in a third phase III.

Figure 8:
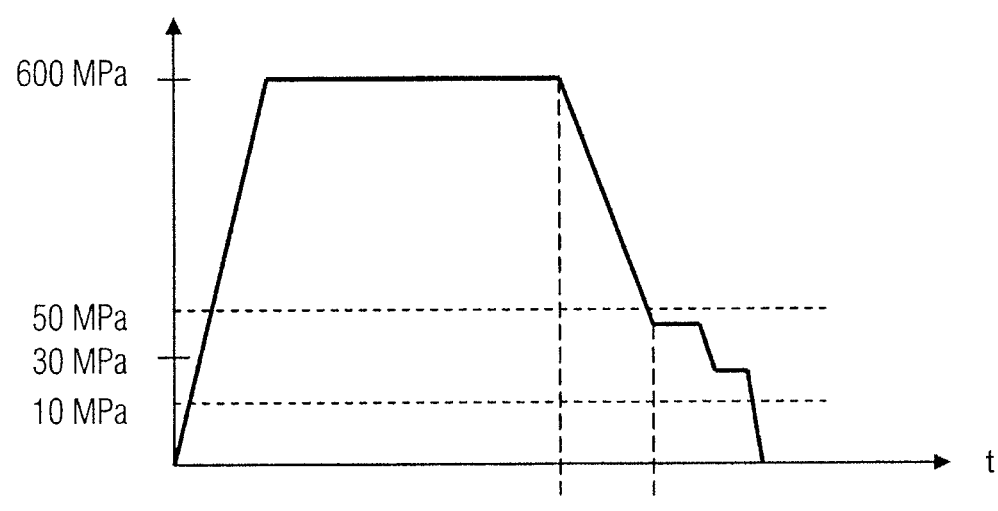
FIG. 8 is a P-t diagram with a further alternative pressure curve.
Figure 9:
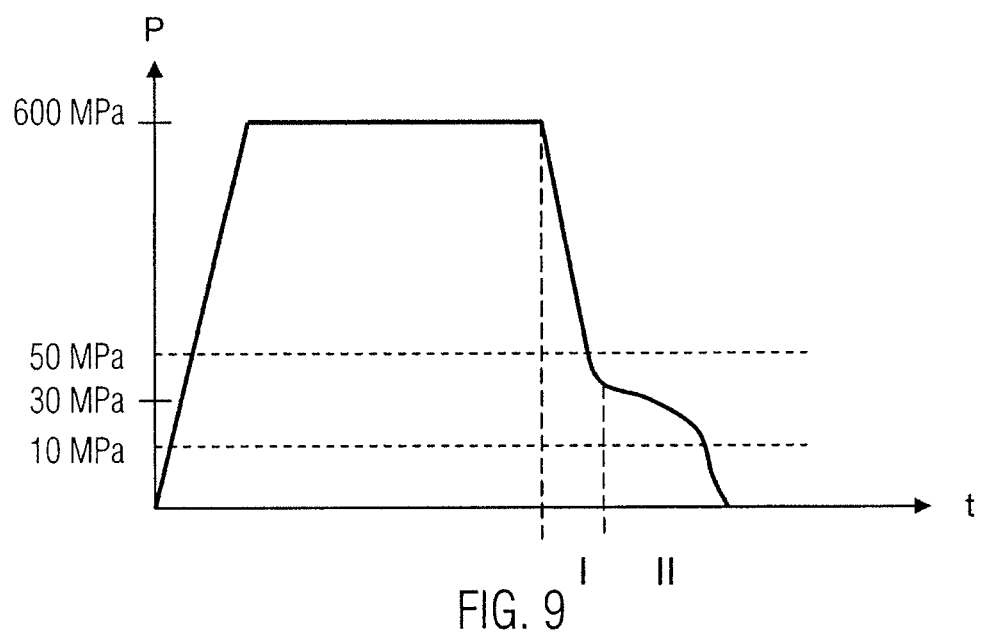
FIG. 9 is a P-t diagram with a further alternative pressure curve.

FIG. 8 shows a multistage pressure reduction in the critical range and FIG. 9 shows a variant with smooth transitions of the different pressure reduction rates (in contrast to the illustration in FIGS. 8 and 9 each pressure stage and each subsequent stronger pressure reduction can also be regarded as a phase of its own). In the variant with the smooth transitions according to FIG. 9 a pressure reduction rate control is already carried out starting from the maximum value of here 600 MPa, and not from a lower value.

The critical range and the suitability of different pressure-reducing variants depend in the case of gassed packs on the packaging material, the gas mixture and the product.

Starting from the illustrated embodiments, the device 1 according to the present disclosure and the method according to the present disclosure can be modified in many respects. For instance, the high-pressure chamber 3 may be provided with a second opening 5 so that it can be simultaneously loaded and unloaded for increasing the cycle rate. The pressure threshold in which the discharge valve 19 automatically closes again can be adjusted so as to adapt the method to different products 2. Specifically, the transition from the first phase to the second phase of the pressure decrease may be variable.

The hot water exiting during pressure reduction can again be returned in a water circulation with optimum cooling to the system for high-pressure generation, or it may flow off.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for processing a food product, comprising:
   loading the food product into a packaging,
   replacing air inside the packaging with a protective gas or a protective gas-mixture,
   subsequent to replacing air inside the packaging by a protective gas or a protective gas mixture:
      gas-tight closing the packaging to form a packaged food product,
      loading the packaged food product into a high-pressure chamber,
      subjecting the packaged food product in the high-pressure chamber to a high-pressure treatment, during which a high-pressure medium acts upon the packaged food product, and
      decreasing the pressure within the high-pressure chamber in a first phase and in a second phase, wherein a mean pressure decrease rate in the first phase is higher than in the second phase.

2. Method according to claim 1, wherein the mean pressure decrease rate in the first phase and/or in the second phase is continuously adjustable.

3. Method according to claim 1, wherein the second phase is followed by a third phase in which the mean pressure decrease rate is higher than in the second phase.

4. The method according to claim 1, wherein the pressure during the high-pressure treatment reaches a value of 300 to 1,000 MPa.

5. The method according to claim 4, wherein the pressure during the high-pressure treatment reaches a value from 300 to 700 MPa.

6. The method according to claim 1, wherein the packaging is made from a plastic film or a film composite.

7. The method according to claim 6, wherein the packaging is made from a multilayer packaging material.

8. The method according to claim 1, wherein, during the second phase, the pressure in the high-pressure chamber is reduced in a controlled way, the pressure in the high pressure chamber being 100 MPa to 0.1 MPa during the second phase.

9. The method according to claim 8, wherein the pressure is reduced during the second phase in a controlled way, the pressure in the high pressure chamber being between 50 MPa and 5 MPa during the second phase.

10. The method according to claim 1, wherein the pressure decrease rate is controlled at least in the second phase by a controllable actuator.

11. The method according to claim 10, wherein the actuator comprises a pressure transformer, and a counter-pressure acting on the actuator is continuously decreased at least over a specific pressure range.

12. The method according to claim 10, wherein the actuator is used for controlling the pressure decrease rate only after the pressure in the high-pressure chamber has been reduced to a predetermined threshold value.

13. The method according to claim 12, wherein the predetermined threshold value is 50 MPa.

14. The method according to claim 1, wherein water is used as the high-pressure medium.

15. A method for the high-pressure treatment of a food product, said method comprising:
   placing the food product into a package made from a multilayer packaging material,
      hermetically sealing the package to form a packaged food product,
      placing the packaged food in a high-pressure chamber,
      subjecting the packaged food product to a high-pressure treatment within the high-pressure chamber, in which a pressurized high-pressure medium acts upon the packaged food product, and
      decreasing pressure within the high-pressure chamber in a first phase at a first mean pressure decrease rate and in a subsequent second phase at a second mean pressure decrease rate, wherein the first mean pressure decrease rate is higher than the second mean pressure decrease rate.

16. The method according to claim 15, wherein a protective gas or a protective gas mixture is provided within the hermetically sealed package.

17. The method according to claim 16, wherein the protective gas or protective gas mixture comprises nitrogen, oxygen or $CO_2$.

18. The method according to claim 15, wherein a rate of the pressure decrease is continuously adjustable.

19. A method for processing a food product, comprising:
   loading the food product into a packaging,
   replacing air inside the packaging with a protective gas or a protective gas-mixture,
   subsequent to introducing a protective gas or a protective gas mixture into the packaging, gas-tight closing the packaging to form a packaged food product, loading the packaged food product into a high-pressure chamber,
   subjecting the packaged food product in the high-pressure chamber to a high-pressure treatment, during which a high-pressure medium acts upon the packaged food product,
   decreasing pressure within the high-pressure chamber in a first phase at a first mean pressure decrease rate, and subsequent to the first phase, decreasing pressure within the high-pressure chamber in second phase at a second mean pressure decrease rate, wherein the first mean pressure decrease rate is higher than the second mean pressure decrease rate.

* * * * *